US010381686B2

(12) United States Patent
Katou et al.

(10) Patent No.: US 10,381,686 B2
(45) Date of Patent: Aug. 13, 2019

(54) ELECTROLYTE SOLUTION AND SECONDARY BATTERY USING SAME

(71) Applicant: NEC Corporation, Tokyo (JP)

(72) Inventors: Yuukou Katou, Tokyo (JP); Takehiro Noguchi, Tokyo (JP); Makiko Takahashi, Tokyo (JP); Hideaki Sasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/327,205

(22) PCT Filed: Jul. 15, 2015

(86) PCT No.: PCT/JP2015/070315
§ 371 (c)(1),
(2) Date: Jan. 18, 2017

(87) PCT Pub. No.: WO2016/010090
PCT Pub. Date: Jan. 21, 2016

(65) Prior Publication Data
US 2017/0162910 A1 Jun. 8, 2017

(30) Foreign Application Priority Data
Jul. 18, 2014 (JP) ................................ 2014-147356

(51) Int. Cl.
| H01M 10/0569 | (2010.01) |
| H01M 10/0567 | (2010.01) |
| H01M 10/0525 | (2010.01) |
| H01M 4/505 | (2010.01) |
| H01M 4/525 | (2010.01) |
| H01M 4/58 | (2010.01) |
| H01M 10/052 | (2010.01) |
| H01M 4/131 | (2010.01) |

(52) U.S. Cl.
CPC ....... *H01M 10/0569* (2013.01); *H01M 4/131* (2013.01); *H01M 4/505* (2013.01); *H01M 4/525* (2013.01); *H01M 4/58* (2013.01); *H01M 10/052* (2013.01); *H01M 10/0525* (2013.01); *H01M 10/0567* (2013.01); *H01M 2300/004* (2013.01); *H01M 2300/0034* (2013.01); *Y02E 60/122* (2013.01); *Y02P 70/54* (2015.11); *Y02T 10/7011* (2013.01)

(58) Field of Classification Search
CPC ...... H01M 4/131; H01M 4/505; H01M 4/525; H01M 4/58; H01M 10/052; H01M 10/0525; H01M 10/0567; H01M 10/0569
See application file for complete search history.

(56) References Cited

U.S. PATENT DOCUMENTS

| 2001/0014422 | A1* | 8/2001 | Omaru | H01M 2/348 429/231.1 |
| 2006/0115739 | A1* | 6/2006 | Yamaguchi | H01M 4/587 429/326 |
| 2009/0017386 | A1 | 1/2009 | Xu et al. | |
| 2010/0119956 | A1 | 5/2010 | Tokuda et al. | |
| 2011/0159379 | A1* | 6/2011 | Matsumoto | H01M 4/0421 429/326 |
| 2012/0094190 | A1* | 4/2012 | Mimura | H01M 10/052 429/324 |
| 2013/0071758 | A1 | 3/2013 | Oya et al. | |
| 2013/0266847 | A1* | 10/2013 | Noguchi | H01M 10/0525 429/163 |
| 2014/0377635 | A1* | 12/2014 | Matsumoto | H01M 4/133 429/163 |
| 2015/0086876 | A1* | 3/2015 | Taeda | H01M 10/0525 429/332 |
| 2017/0012321 | A1* | 1/2017 | Dubois | H01M 10/0569 |

FOREIGN PATENT DOCUMENTS

| CA | 2693692 A1 | 1/2009 |
| JP | 2008-021560 A | 1/2008 |
| JP | 2008-041635 A | 2/2008 |
| JP | 2009-123707 A | 6/2009 |
| JP | 2010-533359 A | 10/2010 |
| JP | 2011-124039 A | 6/2011 |
| JP | 2012-094491 A | 5/2012 |
| JP | 2013-062164 A | 4/2013 |
| JP | 5201364 B2 | 6/2013 |
| JP | 2013-161706 A | 8/2013 |
| JP | 2013-218963 A | 10/2013 |
| JP | 2013-254605 A | 12/2013 |
| WO | WO-2008/126800 A1 | 10/2008 |
| WO | WO-2009/009251 A1 | 1/2009 |
| WO | WO 2012/077712 | * 6/2012 |
| WO | WO2013/129346 | * 9/2013 |
| WO | WO 2013/157504 | * 10/2013 |

OTHER PUBLICATIONS

International Search Report corresponding to PCT/JP2015/070315 dated Oct. 20, 2015 (2 pages).

* cited by examiner

*Primary Examiner* — Anca Eoff
(74) *Attorney, Agent, or Firm* — Wilmer Cutler Pickering Hale and Dorr LLP

(57) ABSTRACT

The present invention relates to a nonaqueous electrolyte solution comprising a nonaqueous electrolyte solvent which comprises a fluorine-containing phosphate ester represented by a specific formula, a fluorine-containing ether represented by a specific formula, and an open-chain or cyclic acid anhydride. According to the present invention, there is provided an electrolyte solution capable of realizing a lithium secondary battery having an excellent cycle characteristics with little gas generation after charge-discharge cycles.

20 Claims, 3 Drawing Sheets

ELECTROLYTE SOLUTION AND SECONDARY BATTERY USING SAME

CROSS-REFERENCE TO RELATED APPLICATIONS

This application is a national stage application of International Application No. PCT/JP2015/070315 entitled "ELECTROLYTE SOLUTION AND SECONDARY BATTERY USING SAME," filed on Jul. 15, 2015, which claims the benefit of the priority of Japanese Patent Application No. 2014-147356 filed on Jul. 18, 2014, the disclosures of each of which are hereby incorporated by reference in their entirety.

TECHNICAL FIELD

The present invention relates to an electrolyte solution, and further, a secondary battery, preferably a lithium ion secondary battery using the electrolyte solution, and a method for manufacturing thereof.

BACKGROUND ART

Since a lithium secondary battery (lithium ion secondary battery) has a small size and large capacity, it is widely utilized for applications such as a portable electric device and a personal computer. However, while a rapid development of portable electric devices or the use for electric vehicles have been realized in recent years, further improvement in energy density has been an important technical subject.

There are several methods to increase energy density of a lithium secondary battery. Among them, it is effective to increase an operation potential of the battery. In a lithium secondary battery using conventional lithium cobalt oxide or lithium manganate as a positive electrode active material, the operation potential of each case is 4 V class (average operation potential=3.6 to 3.8 V: versus lithium potential). In these positive electrode active materials, the operation voltage is determined by oxidation-reduction reaction of a Co ion or Mn ion ($Co^{3+} \leftrightarrow Co^{4+}$ or $Mn^{3+} \leftrightarrow Mn^{4+}$).

In addition, it is known that an operation potential of 5 V class can be achieved by, for example, using a spinel compound in which Mn of lithium manganate is replaced with Ni or Co, Fe, Cu, Cr and others, as an active material. Specifically, as in Patent Document 1, it is known that a spinel compound such as $LiNi_{0.5}Mn_{1.5}O_4$ shows a potential plateau in the area of 4.5 V or more. In such a spinel compound, Mn is present in the quadrivalent state, and the operation potential is determined by oxidation-reduction of $Ni^{2+} \leftrightarrow Ni^{4+}$ instead of oxidation-reduction of $Mn^{3+} \leftrightarrow Mn^{4+}$.

For example, $LiNi_{0.5}Mn_{1.5}O_4$ has a capacity of 130 mAh/g or more, and the average operation voltage is 4.6 V or more versus lithium metal. Although its capacity is smaller than that of $LiCoO_2$, energy density of the battery is higher than that of $LiCoO_2$. Furthermore, a spinel type lithium manganese oxide has a three-dimensional lithium diffusion path and also has advantages such as excellent thermodynamic stability and easy synthesis. For these reasons, $LiNi_{0.5}Mn_{1.5}O_4$ holds promise as a future positive electrode material.

As for an electrolyte solution used in a lithium secondary battery, the examples described in the following documents are proposed.

Patent Document 2 discloses an electrolyte solution that contains a phosphate ester and a compound having a sulfone structure. According to this document, it is disclosed that swelling deformation of the battery exterior during high temperature storage can be prevented in a lithium secondary battery using a 4 V class electrode.

Patent Document 3 discloses a nonaqueous electrolyte solution for battery, which contains: an unsaturated phosphate ester compound as (A) component; at least one compound selected from the group consisting of a sulfite ester compound, a sulfonate ester compound, an imide salt compound of an alkali metal, a fluorosilane compound, an organic disilane compound and an organic disiloxane compound as (B) component; an organic solvent as (C) component; and an electrolyte salt as (D) component. According to this document, it is disclosed that less inner resistance and high electric capacity can be maintained during long-term use in a nonaqueous electrolyte secondary battery which has a negative electrode manufactured comprising a highly crystalline carbon material such as graphite as an active material, and a high molecular weight carboxylic acid compound as a binder.

In Patent Document 4, a secondary battery that has an electrolyte solution containing a fluorine-containing phosphate ester is disclosed.

Patent Document 5 discloses an electrolyte solution containing, a carbonic acid ester having a halogen, at least one compound from dicarbonates represented by a specific formula, dicarboxylic acid esters and disulfonic acid esters, and phosphoric acid esters. The same document discloses that the solvent may further contain a cyclic carbonate ester having an unsaturated bond, a sultone, an acid anhydride and the like.

Patent Document 6 discloses a nonaqueous electrolyte solution containing a monofluorophosphate salt and/or a difluorophosphate salt. This document furthermore discloses that good battery characteristics can be maintained if at least one compound A is added to the electrolyte solution, and discloses phosphoric acid esters and acid anhydrides, as compound A.

CITATION LIST

Patent Document

Patent Document 1: Japanese Patent Laid-Open No. 2009-123707
Patent Document 2: Japanese Patent Laid-Open No. 2008-41635
Patent Document 3: Japanese Patent Laid-Open No. 2011-124039
Patent Document 4: Japanese Patent Laid-Open No. 2008-021560
Patent Document 5: Japanese Patent No. 5201364
Patent Document 6: WO 2008/126800

SUMMARY OF INVENTION

Technical Problem

However, in the case of the battery using a positive electrode material having high discharge potential such as $LiNi_{0.5}Mn_{1.5}O_4$ as an active material, the potential becomes still higher than the case where a positive electrode uses $LiCoO_2$, $LiMn_2O_4$ and the like, and thus decomposition reaction of the electrolyte solution easily occurs in a contact portion with the positive electrode. Therefore, there was a case where volume expansion and a decrease in capacity due to gas generation associated with charge-and-discharge cycles became remarkable. Further, even when a 4V class positive electrode material as an active material is used, the decomposition reaction of the electrolyte solution tends to occur in the long-term charge/discharge cycle or in the use or storage under high-temperature conditions. In particular, degradation of the electrolyte solution tends to become remarkable with increasing temperature, and there was a problem of a life improvement during operation at a high temperature such as 40° C. or more.

Accordingly, an object of the present invention is to provide an electrolyte solution capable of realizing a lithium secondary battery having an excellent cycle characteristics while suppressing gas generation.

Solution to Problem

An embodiment of the present invention relates to a non-aqueous electrolyte solution comprising a nonaqueous electrolyte solvent which comprises a fluorine-containing phosphate ester represented by the following formula (1), a fluorine-containing ether represented by the following formula (2), and an open-chain or cyclic acid anhydride;

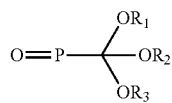
(1)

wherein $R_1$, $R_2$ and $R_3$ are each independently substituted or unsubstituted alkyl group, and at least one of $R_1$, $R_2$ and $R_3$ is fluorine-containing alkyl group.

(2)

wherein A and B are each independently substituted or unsubstituted alkyl group, and at least one of A and B is fluorine-containing alkyl group.

Advantageous Effects of Invention

By the use of a nonaqueous electrolyte solution of the present invention, a secondary battery having excellent cycle characteristics is provided.

DESCRIPTION OF EMBODIMENTS (Electrolyte Solution)

Figure 1:
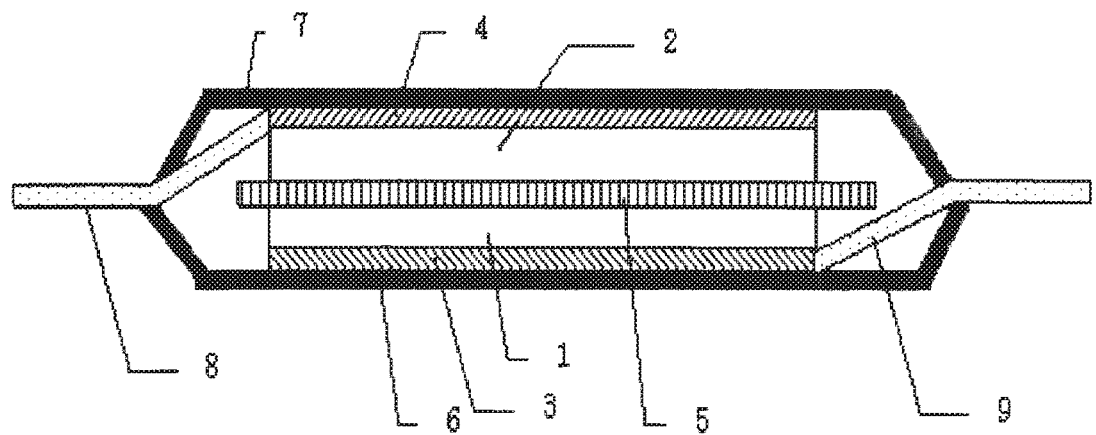
FIG. 1 is a cross-sectional view of a secondary battery of one embodiment of the present invention.

The nonaqueous electrolyte solution comprises a supporting salt and a nonaqueous electrolyte solvent, wherein the nonaqueous electrolyte solvent comprises a fluorine-containing phosphate ester represented by the formula (1), a fluorine-containing ether represented by the formula (2), and an acid anhydride.

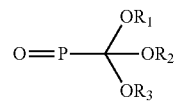
(1)

wherein $R_1$, $R_2$ and $R_3$ are each independently substituted or unsubstituted alkyl group, and at least one of $R_1$, $R_2$ and $R_3$ is a fluorine-containing alkyl group.

(2)

wherein A and B are each independently substituted or unsubstituted alkyl group, and at least one of A and B is a fluorine-containing alkyl group.

The use of the above-mentioned non-aqueous electrolyte solvent suppresses the volume expansion of the secondary battery, thereby improving the capacity retention ratio. Although the reason is not clear, in the electrolyte solution containing these, it is presumed that the fluorine-containing phosphate ester and the fluorine-containing ether act as oxidation resistant solvents, and the acid anhydride forms a reaction product on the electrode, and therefore the reaction of the electrolyte solution is suppressed and the volume expansion is reduced. Furthermore, it is presumed that because these function synergistically, the cycle characteristics are improved toward better characteristics. These characteristics are the characteristics that are affected more significantly in the use of the secondary battery in the long-term charge/discharge cycles or in the storage under high-temperature conditions in which the decomposition of the electrolyte solution becomes a serious problem, and also when a high potential positive electrode active material used.

The content of the fluorine-containing phosphate ester represented by the formula (1) contained in the nonaqueous electrolyte solvent is not particularly limited, but 5 vol % or more and 95 vol % or less in the nonaqueous electrolyte solvent is preferable. When the content of the fluorine-containing phosphate ester in the nonaqueous electrolyte solvent is 5 vol % or more, an effect of enhancing voltage endurance is more improved. Meanwhile, when the content of the fluorine-containing phosphate ester in the nonaqueous electrolyte solvent is 95 vol % or less, ion conductivity of the electrolyte solution is increased to provide a better charge-discharge rate of the battery. The content of the fluorine-containing phosphate ester in the nonaqueous electrolyte solvent is preferably 10 vol % or more. Furthermore, from the viewpoint of voltage endurance, it is preferably at least 15 vol % more, more preferably at least 20 vol % or more, furthermore preferably at least 25 vol % or more. Furthermore, the content of the fluorine-containing phosphate ester in the nonaqueous electrolyte solvent is more preferably 70 vol % or less, still more preferably 60 vol % or less, especially preferably 59 vol % or less, and more especially preferably 55 vol % or less.

In the fluorine-containing phosphate represented by the formula (1), $R_1$, $R_2$ and $R_3$ are each independently substituted or unsubstituted alkyl group, and at least one of $R_1$, $R_2$ and $R_3$ is a fluorine-containing alkyl group. The fluorine-containing alkyl group is alkyl group that has at least one fluorine atom. It is preferable that the numbers of carbon atoms of the alkyl groups $R_1$, $R_2$ and $R_3$ be each independently 1 or more and 4 or less, and 1 or more and 3 or less is more preferable. This is because when the number of carbon atoms of the alkyl group is 4 or less, an increase in viscosity of an electrolyte solution is suppressed to facilitate permeation of the electrolyte solution into pores of the electrode or the separator, and ionic conductivity is enhanced, which leads to improve a current value in charge-discharge characteristics of the battery.

Furthermore, in the formula (1), all of $R_1$, $R_2$ and $R_3$ are preferably fluorine-containing alkyl groups.

At least one of $R_1$, $R_2$ and $R_3$ is preferably fluorine-containing alkyl group in which 50% or more of hydrogen atoms contained in the corresponding unsubstituted alkyl group are replaced with fluorine atoms. In addition, it is more preferable that all of $R_1$, $R_2$ and $R_3$ are fluorine-containing alkyl groups, and that $R_1$, $R_2$ and $R_3$ are fluorine-containing alkyl groups in which 50% or more of hydrogen atoms contained in the corresponding unsubstituted alkyl group are replaced with fluorine atoms. This is because the large content of fluorine atom improves voltage endurance, and thus even when there is used a positive electrode active material operating at a potential of 4.5 V or more versus lithium, degradation of the battery capacity after cycles is more reduced. Furthermore, it is more preferable that the ratio of fluorine atoms in the substituents (including hydrogen atoms) of the fluorine-containing alkyl group is 55% or more.

$R_1$ to $R_3$ may have a substituent other than a fluorine atom, and the substituent includes at least one selected from the group consisting of amino group, carboxy group, hydroxy group, cyano group and halogen atom (for example, a chlorine atom and a bromine atom). The above-mentioned number of carbon atoms is described in the conception including substituents.

Examples of the fluorine-containing phosphate ester include tris(trifluoromethyl) phosphate, tris(trifluoroethyl) phosphate, tris(tetrafluoropropyl) phosphate, tris(pentafluoropropyl) phosphate, tris(heptafluorobutyl) phosphate, and tris(octafluoropentyl) phosphate. In addition, examples of the fluorine-containing phosphate ester include trifluoroethyl dimethyl phosphate, bis(trifluoroethyl) methyl phosphate, bistrifluoroethyl ethyl phosphate, pentafluoropropyl dimethyl phosphate, heptafluorobutyl dimethyl phosphate, trifluoroethyl methyl ethyl phosphate, pentafluoropropyl methyl ethyl phosphate, heptafluorobutyl methyl ethyl phosphate, trifluoroethyl methyl propyl phosphate, pentafluoropropyl methyl propyl phosphate, heptafluorobutyl methyl propyl phosphate, trifluoroethyl methyl butyl phosphate, pentafluoropropyl methyl butyl phosphate, heptafluorobutyl methyl butyl phosphate, tri fluoroethyl diethyl phosphate, pentafluoropropyl diethyl phosphate, heptafluorobutyl diethyl phosphate, trifluoroethyl ethyl propyl phosphate, pentafluoropropyl ethyl propyl phosphate, heptafluorobutyl ethyl propyl phosphate, trifluoroethyl ethyl butyl phosphate, pentafluoropropyl ethyl butyl phosphate, heptafluorobutyl ethyl butyl phosphate, trifluoroethyl dipropyl phosphate, pentafluoropropyl dipropyl phosphate, heptafluorobutyl dipropyl phosphate, trifluoroethyl propyl butyl phosphate, pentafluoropropyl propyl butyl phosphate, heptafluorobutyl propyl butyl phosphate, trifluoroethyl dibutyl phosphate, pentafluoropropyl dibutyl phosphate, and heptafluorobutyl dibutyl phosphate. Examples of tris(tetrafluoropropyl) phosphate include tris(2,2,3,3-tetrafluoropropyl) phosphate. Examples of tris(pentafluoropropyl) phosphate include tris (2,2,3,3,3-pentafluoropropyl) phosphate. Examples of tris (trifluoroethyl) phosphate include tris(2,2,2-trifluoroethyl) phosphate (hereinafter also referred to as PTTFE). Examples of tris(heptafluorobutyl) phosphate include tris(1H,1H-heptafluorobutyl) phosphate. Examples of tris(octafluoropentyl) phosphate include tris(1H,1H,5H-octafluoropentyl) phosphate. Among these, tris(2,2,2-trifluoroethyl) phosphate represented by the following formula (3) is preferred because of its high effect of suppressing decomposition of the electrolyte solution at a high potential. The fluorine-containing phosphate ester can be used alone or in combinations of two or more.

(1-1)

The content of the fluorine-containing open-chain ether represented by the formula (2) contained in the nonaqueous electrolyte solvent is not particularly limited, but 5 vol % or more and 70 vol % or less in the nonaqueous electrolyte solvent is preferable. When the content of the fluorine-containing open-chain ether in the nonaqueous electrolyte solvent is 5 vol % or more, the viscosity of the electrolyte solution is reduced and therefore the conductivity is improved. Also, the effect of enhancing the oxidation resistance can be obtained. Meanwhile, when the content of the fluorine-containing open-chain ether in the nonaqueous electrolyte solvent is 70 vol % or less, it is possible to maintain high conductivity of the electrolyte solution, and also it is possible to ensure the compatibility of the electrolyte solution. The content of the fluorine-containing open-chain ether in the nonaqueous electrolyte solvent is preferably 10 vol % or more, and particularly preferably 15 vol % or more. Furthermore, from the viewpoint of oxidation resistance, it is preferably 20 vol % more, more preferably 30 vol % or more. Furthermore, the content of the fluorine-containing open-chain ether in the nonaqueous electrolyte solvent is more preferably 65 vol % or less, still more preferably 60 vol % or less, and especially preferably 55 vol % or less.

In the fluorine-containing ether represented by the formula (2), A and B are each independently substituted or unsubstituted alkyl group, and at least one of A and B is a fluorine-containing alkyl group. "Fluorine-containing alkyl group" means an alkyl group having at least one fluorine atom. It is preferable that the numbers of carbon atoms of the alkyl groups A and B be each independently 1 or more and 10 or less, and 1 or more and 6 or less is more preferable. There are some cases in which 4 or more and 9 or less is preferable. This is because when the number of carbon atoms of the alkyl group is 10 or less, an increase in viscosity of an electrolyte solution is suppressed to facilitate permeation of the electrolyte solution into pores of the electrode or the separator, and ionic conductivity is enhanced, which leads to the improvement in a current value in charge-discharge characteristics of the battery.

Furthermore, in the formula (2), all of A and B are preferably fluorine-containing alkyl groups.

At least one of A and B is preferably a fluorine-containing alkyl group in which 50% or more of hydrogen atoms contained in the corresponding unsubstituted alkyl group are replaced with fluorine atoms. In addition, it is more preferable that all of A and B are fluorine-containing alkyl groups, and that A and B are fluorine-containing alkyl groups in which 50% or more of hydrogen atoms contained in the corresponding unsubstituted alkyl groups are replaced with fluorine atoms. This is because a large content of fluorine atom improves voltage endurance, and thus even when there is used a positive electrode active material operating at a potential of 4.5 V or more versus lithium, degradation of the battery capacity after cycles is more reduced. Furthermore, it is more preferable that the ratio of fluorine atoms in the substituents (including hydrogen atoms) of the fluorine-containing alkyl group is 55% or more.

A and B may have a substituent other than a fluorine atom, and the substituent includes at least one selected from the group consisting of amino group, carboxy group, hydroxy group, cyano group and halogen atom (for example, chlorine atom and bromine atom). The number of carbon atoms mentioned above is intended to include the number of carbon atoms in substituents.

Examples of the fluorine-containing open-chain ether include compounds having structures in which part of or all of the hydrogen atoms of 1,2-diethoxyethane (DEE) or ethoxy methoxy ethane (EME) are replaced with fluorine atoms and the like. Specific examples of the fluorine-containing open-chain ethers include, for example, 2,2,3,3,3-pentafluoropropyl 1,1,2,2-tetrafluoroethyl ether, 1,1,2,2-tetrafluoroethyl 2,2,2-trifluoroethyl ether, 1H, 1H, 2'H, 3H-decafluorodipropyl ether, 1,1,2,3,3,3-hexafluoropropyl 2,2-difluoroethyl ether, isopropyl 1,1,2,2-tetrafluoroethyl ether, propyl 1,1,2,2-tetrafluoroethyl ether, 1,1,2,2-tetrafluoroethyl 2,2,3,3-tetrafluoropropyl ether, 1H, 1H, 5H-perfluoropentyl 1,1,2,2-tetrafluoroethyl ether, 1H, 1H, 2'H-perfluorodipropyl ether, 1H-perfluorobutyl 1H-perfluoroethyl ether, methyl perfluoropentyl ether, methyl perfluorohexyl ether, methyl 1,1,3,3,3-pentafluoro-2-(trifluoromethyl)propyl ether, 1,1,2,3,3,3-hexafluoropropyl 2,2,2-trifluoroethyl ether, ethyl nonafluorobutyl ether, ethyl 1,1,2,3,3,3-hexafluoropropyl ether, 1,1,2,3,3,3-hexafluoropropyl 1H, 1H-heptafluorobutyl ether, bis(2,2,3,3-tetrafluoropropyl) ether, bis(2,2,3,3,3-pentafluoropropyl) ether, 1H, 1H, 5H-octafluoropentyl 1,1,2,2-tetrafluoroethyl ether, 1H, 1H, 2'H-perfluorodipropyl ether, heptafluoropropyl 1,2,2,2-tetrafluoroethyl ether, 1,1,2,2-tetrafluoroethyl-2,2,3,3-tetrafluoropropyl ether, 2,2,3,3,3-pentafluoropropyl 1,1,2,2-tetrafluoroethyl ether, ethyl nonafluorobutyl ether, methyl nonafluorobutyl ether, 2,2,3,4,4,4-hexafluorobutyl difluoromethyl ether, 1,1-difluoroethyl 2,2,3,3-tetrafluoropropyl ether, 1,1-difluoroethyl 1H, 1H-heptafluorobutyl ether, bis (1H, 1H-heptafluorobutyl) ether, nonafluorobutyl methyl ether, 2,2-difluoroethyl 1,1,2,2-tetrafluoroethyl ether, bis(2, 2-difluoroethyl) ether, bis(1,1,2-trifluoroethyl) ether, 1,1,2-trifluoroethyl 2,2,2-trifluoroethyl ether, bis(1,1,2,2-tetrafluoroethyl) ether and the like. Among these, from the viewpoint of voltage endurance and boiling point, 1,1,2,2-tetrafluoroethyl 2,2,3,3-tetrafluoropropyl ether, 1H, 1H, 2'H, 3H-decafluorodipropyl ether, 1H, 1H, 2'H-perfluorodipropyl ether, ethyl nonafluorobutyl ether are preferred.

The open-chain ether may be evaporated at the time of high temperature operation of the battery because its boiling point tends to become low when the number of carbon atoms is small. On the other hand, when the number of carbon atoms is too large, viscosity of the open-chain ether may become high, resulting in decrease in electrical conductivity of the electrolyte solution. Therefore, the number of carbon atoms is preferably 4 or more and 10 or less. For this reason, the open-chain ether is preferably a fluorine-containing open-chain ether represented by the following formula (2-1).

$$C_nH_{2n+1-l}F_l\text{—}O\text{—}C_mH_{2m+1-k}F_k \quad (2\text{-}1)$$

wherein n is 1, 2, 3, 4, 5 or 6; m is 1, 2, 3 or 4; l is any integer from 0 to 2n+1; k is any integer from 0 to 2m+1; and at least one of l and k is an integer of 1 or more.

In the fluorine-containing open-chain ether shown by the formula (2-1), when the amount of fluorine substitution is too low, the fluorine-containing open-chain ether may react with the positive electrode of a high potential, and thereby a capacity retention ratio of the battery may fall or gas may be generated. On the other hand, when the amount of fluorine substitution is too high, compatibility of the fluorine-containing open-chain ether with the other solvents may decrease, or a boiling point of the fluorine-containing open-chain ether may be lowered. For these reasons, the amount of fluorine substitution is preferably 10% or more and 90% or less, and more preferably 20% or more and 85% or less. This means that, it is preferable that l, m and n of the formula (2-1) satisfy the following formula.

$$0.1 \le (l+k)/(2n+2m+2) \le 0.9$$

The content of the acid anhydride contained in the nonaqueous electrolyte solvent is not particularly limited, but typically 0.01 mass % or more and less than 10 mass % in the nonaqueous electrolyte solvent is preferable, and 1 mass % or more to 5 mass % or less is more preferable. When the content of the acid anhydride in the nonaqueous electrolyte solvent is 0.01 mass % or more, an effect of enhancing capacity retention ratio is obtained and moreover, the effect of suppressing gas generation due to decomposition of the electrolyte solution is obtained. The content of the acid anhydride in the nonaqueous solvent is more preferably 0.1 mass % or more. Further, if the content of the acid anhydride in the nonaqueous solvent is less than 10 mass %, it is possible to maintain a good capacity retention ratio, also possible to suppress gas generation due to decomposition of the acid anhydride. The content of the acid anhydride in the nonaqueous solvent is more preferably 5 mass % or less. The content of the acid anhydride in the nonaqueous solvent is furthermore preferably 0.5 mass % or more, and particularly preferably 0.8 mass % or more. The content of the acid anhydride in the nonaqueous solvent is furthermore preferably 3 mass % or less, and particularly preferably 2 mass % or less.

As the acid anhydrides, for example, carboxylic acid anhydrides, sulfonic acid anhydrides, and anhydrides of carboxylic acid and sulfonic acid are exemplified.

It is presumed that the acid anhydride in the electrolyte solution, forms a reaction product on the electrode, thereby suppressing the volume expansion of the battery due to charging and discharging and achieving an effect of improving cycle characteristics. Further, although it is a presumption, acid anhydrides as described above are considered to combine with water in the electrolyte solution, to suppress the gas generation originated from water.

Examples of the acid anhydrides include open-chain acid anhydrides represented by the following formula (3), and cyclic acid anhydrides represented by the following formula (4).

(3)

(in formula (3),
two $X_1$ are each independently a carbonyl group (—C(=O)—) or a sulfonyl group (—S(=O)$_2$—); and
$R^1$ and $R^2$ are each independently an alkyl group having 1 to 10 carbon atoms, an alkenyl group having 2 to 10 carbon atoms, a cycloalkyl group having 3 to 10 carbon atoms, an aryl group having 6 to 18 carbon atoms or an arylalkyl group having 7 to 20 carbon atoms, and at least one of hydrogen atoms in $R^1$ and $R^2$ may be substituted with halogen atom(s).)

(4)

(in formula (4), two $X_2$ are each independently a carbonyl group (—C(=O)—) or a sulfonyl group (—S(=O)$_2$—); and $R^3$ is an alkylene group having 1 to 10 carbon atoms, an alkenylene group having 2 to 10 carbon atoms, an arylene group having 6 to 12 carbon atoms, a cycloalkylene group having 3 to 12 carbon atoms, cycloalkenylene group having 3 to 12 carbon atoms or a heterocycloalkylene group having 3 to 10 carbon atoms, and at least one of hydrogen atoms in $R^3$ may be substituted with halogen atom(s).)

The groups represented by $R^1$ $R^2$ and $R^3$ in the formula (3) and (4) will be described below.

In the formula (3), the alkyl group and alkenyl group each may have a straight chain or branched chain, and the number of carbon atoms is generally 1 to 10, preferably 1 to 8, and more preferably 1 to 5.

In the formula (3), the number of carbon atoms of the cycloalkyl group is preferably 3 to 10, and more preferably 3 to 6.

In the formula (3), the number of carbon atoms of the aryl group is preferably 6 to 18, and more preferably 6 to 12. Examples of the aryl group include phenyl group, naphthyl group, and the like.

In the formula (3), the number of carbon atoms of the arylalkyl group is preferably 7 to 20, and more preferably 7 to 14. Examples of the arylalkyl group include benzyl group, phenylethyl group, naphthylmethyl group, and the like.

In the formula (3), $R^1$ and $R^2$ are each independently more preferably an alkyl group having 1 to 3 carbon atoms or phenyl group.

In the formula (4), the alkylene group and the alkenylene group may each have a straight chain or a branched chain may be straight chain, and the number of carbon atoms is generally 1 to 10, preferably 1 to 8, and more preferably 1 to 5.

In the formula (4), the number of carbon atoms of the arylene group is preferably 6 to 20, and more preferably 6 to 12. Examples of the arylene group include phenylene group, naphthylene group, biphenylene group and the like.

In the formula (4), the number of carbon atoms of the cycloalkylene group is typically 3 to 12, preferably 3 to 10 and more preferably 3 to 8. Cycloalkylene group may be monocyclic or may have a plurality of ring structures like bicycloalkylene group.

In the formula (4), the number of carbon atoms of the cycloalkenylene group is typically 3 to 12, preferably 3 to 10 and more preferably 3 to 8. Cycloalkenylene group may be monocyclic or may have a plurality of ring structures. Examples of cycloalkenylene group include divalent groups formed from cyclohexene, bicyclo[2.2.1]heptene, bicyclo[2.2.2]octane and the like.

In the formula (4), heterocycloalkylene group denotes a divalent group in which at least one of carbon atoms on the ring of the cycloalkylene group is replaced with one, two or more hetero atoms such as sulfur, oxygen and nitrogen. Heteroalkylene group is preferably 3 to 10-membered ring, more preferably 4 to 8-membered ring, and furthermore preferably 5- or 6-membered ring.

In the formula (4), $R^3$ is more preferably an alkylene group having 1 to 3 carbon atoms, an alkenylene group having 2 or 3 carbon atoms, a cyclohexylene group, a cyclohexenylene group or a phenylene group.

The acid anhydride may be halogenated partly. Examples of the halogen atoms include chlorine, iodine, bromine, and fluorine and the like. Among these, chlorine and fluorine are preferred, and fluorine is more preferred.

The acid anhydride represented by the formula (3) or (4) may have a substituent other than halogen atoms. Examples of the substituent include an alkyl group having 1 to 5 carbon atoms, an alkenyl group having 2 to 5 carbon atoms, an alkoxy group having 1 to 5 carbon atoms, an aryl group having 6 to 12 carbon atoms, an amino group, a carboxy group, a hydroxy group, and a cyano group, and the like, but are not limited to these. For example, at least one of hydrogen atoms in the saturated or unsaturated hydrocarbon ring contained in $R^1$, $R^2$ or $R^3$ may be substituted with an alkyl group having 1 to 3 carbon atoms.

Examples of the carboxylic acid anhydrides include open-chain acid anhydrides such as acetic anhydride, propionic anhydride, butyric anhydride, crotonic anhydride and benzoic anhydride; and acid anhydrides having a cyclic structure (cyclic acid anhydrides) such as succinic anhydride, glutaric anhydride, maleic acid, phthalic anhydride, 5,6-dihydroxy-1,4-dithiin-2,3 dicarboxylic anhydride, 5-norbornene-2,3-dicarboxylic anhydride, 1,2,3,6-tetrahydrophthalic anhydride, bicyclo[2.2.2] oct-5-ene-2,3-dicarboxylic anhydride and the like.

Examples of the halogenated compounds include difluoroacetic anhydride, 3H-perfluoropropanoic anhydride, 3,3,3-trifluoropropionic anhydride), pentafluoropropionic anhydride, 2,2,3,3,4,4-hexafluoropentanedioic anhydride, tetrafluoro succinic anhydride, trifluoroacetic anhydride, and the like. In addition to halides, an acid anhydride having other substituents such as 4-methylphthalic anhydride may also be used.

Examples of sulfonic anhydride include open-chain sulfonic anhydrides such as methanesulfonic anhydride, ethanesulfonic anhydride, propanesulfonic anhydride, butanesulfonic anhydride, pentanesulfonic anhydride, hexanesulfonic anhydride, vinylsulfonic anhydride, benzenesulfonic anhydride; cyclic sulfonic anhydrides such as 1,2-ethanedisulfonic anhydride, 1,3-propanedisulfonic anhydride, 1,4-butanedisulfonic anhydride, 1,2-benzenedisulfonic anhydride; and halogenated compounds of these.

Examples of sulfonic anhydride include open-chain sulfonic anhydrides such as methanesulfonic anhydride, ethanesulfonic anhydride, propanesulfonic anhydride, butanesulfonic anhydride, pentanesulfonic anhydride, hexanesulfonic anhydride, vinylsulfonic anhydride, benzenesulfonic anhydride; cyclic sulfonic anhydrides such as 1,2-ethanedisulfonic anhydride, 1,3-propanedisulfonic anhydride, 1,4-butanedisulfonic anhydride, 1,2-benzenedisulfonic anhydride; and halogenated compounds of these.

Among them, the acid anhydride is preferably a carboxylic acid anhydride having a structure represented by, [—(C=O)—O—(C=O)—] in a molecule. Examples of the carboxylic acid anhydrides include open-chain carboxylic acid anhydrides represented by the following formula (3-1), and cyclic carboxylic acid anhydrides represented by the following formula (4-1).

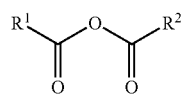

(3-1)

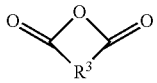

(4-1)

Herein, groups represented by $R^1$, $R^2$ and $R^3$ in the formulae (3-1) and (4-1) are the same as those those exemplified in the above formulae (3) and (4).

Preferred examples of the compound of acid anhydrides include acetic anhydride, maleic anhydride, phthalic anhydride, propionic anhydride, succinic acid, benzoic anhydride, 5,6-dihydroxy-1,4-dithiin-2,3-dicarboxylic anhydride, 5-norbornene-tetrahydrophthalic anhydride, bicyclo[2.2.2]oct-5-ene-2,3-dicarboxylic anhydride and the like; and anhydrides having halogen(s) or other substituent(s) such as difluoroacetic anhydride, 3H-perfluoropropionic anhydride, trifluoropropionic anhydride, pentafluoropropionic anhydride, 2,2,3,3,4,4-hexafluoropentanedioic anhydride, tetrafluorosuccinic anhydride, trifluoroacetic anhydride, 4-methylphthalic anhydride and the like.

The nonaqueous solvent preferably further comprises a cyclic carbonate and/or an open-chain carbonate, in addition to a fluorine-containing phosphate ester and a fluorine-containing ether and an acid anhydride.

Since the cyclic carbonate or the chain carbonate has a large specific dielectric constant, addition of these compounds improves dissociation characteristics of a supporting salt and easily provides sufficient electrical conductivity. Moreover, since the cyclic carbonate and open-chain carbonate have high voltage endurance and electrical conductivity, they are suitable for blending with a fluorine-containing phosphate. Furthermore, by selecting a material that is effective in lowering viscosity of the electrolyte solution, it is also possible to increase ionic mobility in the electrolyte solution.

The cyclic carbonate is not especially limited but includes, for example, ethylene carbonate (EC), propylene carbonate (PC), butylene carbonate (BC), and vinylene carbonate (VC). Moreover, the cyclic carbonate includes a fluorine-containing cyclic carbonate. Examples of the fluorine-containing cyclic carbonate include compounds in which some or all of hydrogen atoms in ethylene carbonate (EC), propylene carbonate (PC), butylene carbonate (BC), and vinylene carbonate (VC) are replaced with fluorine atoms. More specifically for example, 4-fluoro-1,3-dioxolan-2-one, (cis or trans) 4,5-difluoro-1,3-dioxolan-2-one, 4,4-difluoro-1,3-dioxolan-2-one and 4-fluoro-5-methyl-1,3-dioxolan-2-one and the like may be used as the fluorine-containing cyclic carbonate. Among the above-mentioned cyclic carbonate, from viewpoints of voltage endurance and conductivity, ethylene carbonate, propylene carbonate, and a partially fluorinated compound thereof are preferable, and ethylene carbonate is more preferable. The cyclic carbonate may be used singly or in combinations of two or more.

When the cyclic carbonate is contained, from a viewpoint of effects of increasing the dissociation degree of the supporting salt and improving electrical conductivity of the electrolyte solution, the content of the cyclic carbonate in the nonaqueous electrolyte solvent may be preferably 0.1 vol % or more, more preferably 5 vol % or more, still more preferably 10 vol % or more, and especially preferably 15 vol % or more. From the similar viewpoint, the content of the cyclic carbonate in the nonaqueous electrolyte solvent is preferably 70 vol % or less, more preferably 50 vol % or less, and still more preferably 40 vol % or less.

The open-chain carbonate is not particularly limited, but includes, for example, dimethyl carbonate (DMC), ethyl methyl carbonate (EMC), diethyl carbonate (DEC), and dipropyl carbonate (DPC). Moreover, the open-chain carbonate includes a fluorinated open-chain carbonate. Examples of the fluorinated open-chain carbonate include compounds having structures in which some or all of hydrogen atoms of ethyl methyl carbonate (EMC), dimethyl carbonate (DMC), diethyl carbonate (DEC), dipropyl carbonate (DPC) and the like are replaced with fluorine atoms. More specifically, examples of the fluorinated open-chain carbonate include bis(fluoroethyl) carbonate, 3-fluoropropyl methyl carbonate, 3,3,3-trifluoropropyl methyl carbonate, 2,2,2-trifluoroethyl methyl carbonate, 2,2,2-trifluoroethyl ethyl carbonate, monofluoromethyl methyl carbonate, methyl 2,2,3,3-tetrafluoropropyl carbonate, ethyl 2,2,3,3-tetrafluoropropyl carbonate, bis(2,2,3,3-tetrafluoropropyl) carbonate, bis(2,2,2-trifluoroethyl) carbonate, 1-monofluoroethyl ethyl carbonate, 1-monofluoroethyl methyl carbonate, 2-monofluoroethyl methyl carbonate, bis(1-monofluoroethyl) carbonate, bis(2-monofluoroethyl) carbonate, bis(monofluoromethyl) carbonate. Among these, from viewpoints of voltage endurance and electrical conductivity, dimethyl carbonate, 2,2,2-trifluoroethyl methyl carbonate, monofluoromethyl methyl carbonate, methyl 2,2,3,3-tetrafluoropropyl carbonate and the like are preferable. The open-chain carbonate can be used singly or in combinations of two or more.

The open-chain carbonate has an advantage of low viscosity when the number of carbon atoms of the substituent added to a "—OCOO—" structure is small. On the other hand, when the number of carbon atoms is too large, the viscosity of the electrolyte solution may become high, resulting in a decrease of conductivity of Li ion. For this reason, the total number of carbon atoms of two substituents added to a "—OCOO—" structure of the open-chain carbonate is preferably 2 or more and 6 or less. In addition, when a substituent added to a "—OCOO—" structure contains a fluorine atom, oxidation resistance of the electrolyte solution is improved. For this reason, the open-chain carbonate is preferably a fluorinated open-chain carbonate represented by the following formula (5).

$$C_nH_{2n+1-l}F_l\text{—OCOO—}C_mH_{2m+1-k}F_k \quad (5)$$

wherein n is 1, 2 or 3; m is 1, 2 or 3; l is any integer from 0 to 2n+1; k is any integer from 0 to 2m+1; and at least one of l and k is an integer of 1 or more.

In the fluorinated open-chain carbonate shown by the formula (5), when the amount of fluorine substation is small, the fluorinated op en-chain carbonate may react with the positive electrode of a high potential, and thereby a capacity retention ratio of the battery may fall or gas may be generated. On the other hand, if the amount of fluorine substitution is too high, compatibility of the open-chain carbonate with the other solvents may be decreased, or a boiling point of the open-chain carbonate may be decreased. For these reasons, the amount of fluorine substitution is preferably 1% or more and 90% or less, more preferably 5% or more and 85% or less, and still more preferably 10% or more and 80% or less. This means that, it is preferable that l, m and n of the formula (5) satisfy the following formula.

$$0.01 \leq (1+k)/(2n+2m+2) \leq 0.9$$

The open-chain carbonate is effective in lowering viscosity of the electrolyte solution, and can raise electrical conductivity of the electrolyte solution. In view of this, the content of the open-chain carbonate in the nonaqueous electrolyte solvent, when it is contained, is preferably 5 vol % or more, more preferably 10 vol % or more, and still more preferably 15 vol % or more. In addition, the content of the open-chain carbonate in the nonaqueous electrolyte solvent is preferably 90 vol % or less, more preferably 80 vol % or less, and still more preferably 70 vol % or less.

The content of the fluorinated open-chain carbonate, when it is contained, is not particularly limited, but 0.1 vol % or more and 70 vol % or less in the nonaqueous electrolyte solvent is preferable. When the content of the fluorinated open-chain carbonate in the nonaqueous electrolyte solvent is 0.1 vol % or more, viscosity of the electrolyte solution can be lowered to improve electrical conductivity. In addition, an effect of improving oxidation resistance is acquired. When the content of the fluorinated open-chain carbonate in the nonaqueous electrolyte solvent is 70 vol % or less, it is possible to keep high electrical conductivity of the electrolyte solution. In addition, the content of the fluorinated open-chain carbonate in the nonaqueous electrolyte solvent is more preferably 1 vol % or more, still more preferably 5 vol % or more, and especially preferably 10 vol % or more. The content of the fluorinated open-chain carbonate in the nonaqueous electrolyte solvent is more preferably 65 vol % or less, still more preferably 60 vol % or less, and especially preferably 55 vol % or less.

The nonaqueous electrolyte solvent may contain a carboxylate ester.

The carboxylate ester is not especially limited but includes, for example, ethyl acetate, methyl propionate, ethyl formate, ethyl propionate, methyl butyrate, ethyl butyrate, methyl acetate, and methyl formate. Moreover, the carboxylate ester includes a fluorine-containing carboxylate ester. Examples of the fluorine-containing carboxylate ester include a compound having a structure in which some or all of hydrogen atoms of ethyl acetate, methyl propionate, ethyl formate, ethyl propionate, methyl butyrate, ethyl butyrate, methyl acetate or methyl formate are replaced with fluorine atoms. Specifically, examples of the fluorinated carboxylate ester include ethyl pentafluoropropionate, ethyl 3,3,3-trifluoropropionate, methyl 2,2,3,3-tetrafluoropropionate, 2,2-difluoroethyl acetate, methyl heptafluoroisobutyrate, methyl 2,3,3,3-tetrafluoropropionate, methyl pentafluoropropionate, methyl 2-(trifluoromethyl)-3,3,3-trifluoropropionate, ethyl heptafluorobutyrate, methyl 3,3,3-trifluoropropionate, 2,2,2-trifluoroethyl acetate, isopropyl trifluoroacetate, tert-butyl trifluoroacetate, ethyl 4,4,4-trifluorobutyrate, methyl 4,4,4-trifluorobutyrate, butyl 2,2-difluoroacetate, ethyl difluoroacetate, n-butyl trifluoroacetate, 2,2,3,3-tetrafluoropropyl acetate, ethyl 3-(trifluoromethyl)butyrate, methyl tetrafluoro-2-(methoxy)propionate, 3,3,3-trifluoropropyl 3,3,3-trifluoropropionate, methyl difluoroacetate, 2,2,3,3-tetrafluoropropyl trifluoroacetate, 1H,1H-heptafluorobutyl acetate, methyl heptafluorobutyrate and ethyl trifluoroacetate and the like. Among these, from the viewpoints of voltage endurance, a boiling point and the like, ethyl propionate, methyl acetate, methyl 2,2,3,3-tetrafluoropropionate, 2,2,3,3-tetrafluoropropyl trifluoroacetate are preferable as the carboxylate ester. The carboxylate ester is effective in decreasing viscosity of the electrolyte solution as well as an open-chain carbonate. Therefore, for example, the carboxylate ester can be used instead of an open-chain carbonate or can be used together with an open-chain carbonate.

The chain carboxylate ester has an advantage of low viscosity when the number of carbon atoms of the substituent added to a "—COO—" structure is small, but the boiling point also tends to be lower. A chain carboxylate ester having a low boiling point may be evaporated during high temperature operation of the battery. On the other hand, when the number of carbon atoms is too large, viscosity of the electrolyte solution may become high, resulting in a decrease of electrical conductivity. For this reason, the total number of carbon atoms of two substituents added to a "—COO—" structure of the open-chain carbonate is preferably 3 or more and 8 or less. In addition, when the substituent added to a "—COO—" structure contains a fluorine atom, oxidation resistance of the electrolyte solution can be improved. Thus, the chain carboxylate ester is preferably a fluorinated chain carboxylate ester represented by the following formula (6).

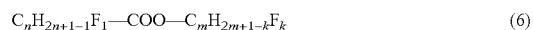

$$C_nH_{2n+1-l}F_l\text{—COO—}C_mH_{2m+1-k}F_k \quad (6)$$

wherein n is 1, 2, 3 or 4; m is 1, 2, 3 or 4; l is any integer from 0 to 2n+1; k is any integer from 0 to 2m+1; and at least one of l and k is an integer of 1 or more.

In the fluorinated chain carboxylate ester shown by the formula (6), when the amount of fluorine substitution is low, the fluorinated chain carboxylate ester may react with the positive electrode of a high potential, and thereby a capacity retention ratio of the battery may fall or gas may be generated. On the other hand, if the amount of fluorine substitution is too high, compatibility of the chain carboxylate ester with the other solvents may fall, or a boiling point of the chain carboxylate ester may be decreased. For these reasons, the amount of fluorine substitution is preferably 1% or more and 90% or less, more preferably 10% or more and 85% or less, and still more preferably 20% or more and 80% or less. This means that, it is preferable that l, m and n of the formula (6) satisfy the following formula.

$$0.01 \leq (1+k)/(2n+2m+2) \leq 0.9$$

The content of carboxylate ester in the nonaqueous electrolyte solvent, when it is contained, is preferably 0.1 vol % or more, more preferably 0.2 vol % or more, still more preferably 0.5 vol % or more, and especially preferably 1 vol % or more. The content of the carboxylate ester in the nonaqueous electrolyte solvent is preferably 50 vol % or less, more preferably 20 vol % or less, still more preferably 15 vol % or less, and especially preferably 10 vol % or less. When the content of the carboxylate ester is 0.1 vol % or more, low temperature characteristics and electrical conductivity can be more improved. Meanwhile, when the content of the carboxylate ester is 50 vol % or less, it is possible to prevent the vapor pressure from becoming too high when the battery is left under high temperature.

The content of fluorinated chain carboxylate ester, when it is contained, is not particularly limited, but 0.1 vol % or more and 50 vol % or less in the nonaqueous electrolyte solvent is preferable. When the content of the fluorinated chain carboxylate ester in the nonaqueous electrolyte solvent is 0.1 vol % or more, the viscosity of the electrolyte solution can be lowered to improve electrical conductivity. In addition, an effect of improving oxidation resistance is acquired. When the content of the fluorinated open-chain carboxylate ester in the nonaqueous electrolyte solvent is 50 vol % or less, electrical conductivity of the electrolyte solution can be kept high and compatibility of the electrolyte solution can be ensured. The content of the fluorinated open-chain carboxylate ester in the nonaqueous electrolyte solvent is more preferably 1 vol % or more, still more preferably 5 vol % or more, and especially preferably 10 vol % or more. Additionally, the content of the fluorinated open-chain carboxylate ester in the nonaqueous electrolyte solvent is more preferably 45 vol % or less, still more preferably 40 vol % or less, and especially preferably 35 vol % or less.

In addition to the fluorine-containing phosphate ester, the nonaqueous electrolyte solvent can contain an alkylene biscarbonate represented by the following formula (7). Since oxidation resistance of an alkylene biscarbonate is equivalent to or slightly higher than that of open-chain carbonate, voltage endurance of the electrolyte solution can be improved.

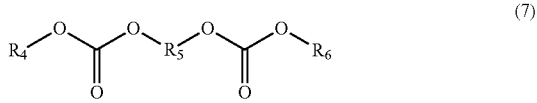

(7)

(Wherein $R_4$ and $R_6$ each independently denote substituted or unsubstituted alkyl group, and $R_5$ denotes substituted or unsubstituted alkylene group.)

In the formula (7), the alkyl group includes a straight chain alkyl or a branched open-chain alkyl. The number of carbon atoms thereof is preferably 1 to 6, and the number of carbon atoms of 1 to 4 is more preferable. The alkylene group is bivalent saturated hydrocarbon group and includes a straight chain alkylene or a branched chain alkylene. The number of carbon atoms thereof is preferably 1 to 4, and the number of carbon atoms of 1 to 3 is more preferable.

Examples of the alkylene biscarbonate represented by the formula (7) include 1,2-bis(methoxycarbonyloxy) ethane, 1,2-bis(ethoxycarbonyloxy) ethane, 1,2-bis(methoxycarbonyloxy) propane, and 1-ethoxycarbonyloxy-2-methoxycarbonyloxy ethane. Among these, 1,2-bis(methoxycarbonyloxy) ethane is preferable.

The content of the alkylene biscarbonate in the nonaqueous electrolyte solvent, when it is contained, is preferably 0.1 vol % or more, more preferably 0.5 vol % or more, still more preferably 1 vol % or more, and especially preferably 1.5 vol % or more. The content of the alkylene biscarbonate in the nonaqueous electrolyte solvent is preferably 70 vol % or less, more preferably 60 vol % or less, still more preferably 50 vol % or less, and especially preferably 40 vol % or less.

The alkylene biscarbonate is a material having low permittivity. Therefore, for example, it can be used instead of an open-chain carbonate or together with an open-chain carbonate.

The nonaqueous electrolyte solvent may contain an open-chain ether.

Examples of the open-chain ethers include, but are not particularly limited, 1,2-diethoxyethane (DEE) or ethoxy methoxy ethane (EME) and the like. Further, the open-chain ether may comprise a halogenated open-chain ether other than the fluorine-containing ether and represented by a formula other than the formula (2). Halogenated open-chain ethers have high oxidation resistance, and is therefore preferably used when the positive electrode which operates at a high potential is used.

An open-chain ether is, as an open-chain carbonate, effective in reducing viscosity of an electrolyte solution. Therefore, for example, an open-chain ether can be used instead of an open-chain carbonate or a carboxylate ester, or can be used together with an open-chain carbonate and/or a carboxylate ester.

The content of the open-chain ether, when it is contained, is not particularly limited, but 0.1 vol % or more and 70 vol % or less in a nonaqueous electrolyte solvent is preferable.

When the content of the open-chain ether in the nonaqueous electrolyte solvent is 0.1 vol % or more, viscosity of the electrolyte solution can be lowered to improve electrical conductivity. In addition, an effect of improving oxidation resistance is acquired. When the content of the open-chain ether in the nonaqueous electrolyte solvent is 70 vol % or less, it is possible to keep high electrical conductivity of the electrolyte solution and to ensure compatibility of the electrolyte solution. Moreover, the content of the open-chain ether in the nonaqueous electrolyte solvent is more preferably 1 vol % or more, still more preferably 5 vol % or more, and especially preferably 10 vol % or more. The content of the open-chain ether in the nonaqueous electrolyte solvent is more preferably 65 vol % or less, still more preferably 60 vol % or less, and especially preferably 55 vol % or less.

The nonaqueous electrolyte solvent may comprise a sulfone compound represented by the following formula (8).

(8)

(wherein, $R_1$ and $R_2$ each independently represent substituted or unsubstituted alkyl group, and a carbon atom of $R_1$ and a carbon atom of $R_2$ may be bonded through a single bond or double bond to form a cyclic structure.)

In the sulfone compound represented by Formula (8), the number of carbon atoms $n^1$ of $R_1$, and the number of carbon atoms $n_2$ of $R^2$, are respectively preferably $1 \leq n_1 \leq 12$ and $1 \leq n_2 \leq 12$, more preferably $1 \leq n_1 \leq 6$ and $1 \leq n_2 \leq 6$, and still more preferably $1 \leq n_1 \leq 3$ and $1 \leq n_2 \leq 3$. The alkyl group also includes straight-chain, branched-chain, and cyclic ones.

Examples of the substituent in $R_1$ and $R_2$ include alkyl groups having 1 to 6 carbon atoms (for example, a methyl group, ethyl group, propyl group, isopropyl group, butyl group, and isobutyl group), aryl groups having 6 to 10 carbon atoms (for example, phenyl group and naphthyl group), and halogen atoms (for example, chlorine atom, bromine atom, and fluorine atom).

In an embodiment, the sulfone compound is preferably a cyclic sulfone compound represented by the following Formula (8-1):

(8-1)

(wherein, $R_3$ represents substituted or unsubstituted alkylene group.)

The alkylene group in $R_3$ has preferably 4 to 9 carbon atoms and more preferably 4 to 6 carbon atoms.

Examples of the substituent in $R_3$ include alkyl groups having 1 to 6 carbon atoms (for example, methyl group, ethyl group, propyl group, isopropyl group, and butyl group), and halogen atoms (for example, a chlorine atom, bromine atom, and fluorine atom).

In an embodiment, the cyclic sulfone compound is more preferably a compound represented by the following Formula (8-2):

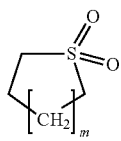

(8-2)

(wherein, m is an integer of 1 to 6.)

In Formula (8-2), m is an integer of 1 to 6 and preferably an integer of 1 to 3.

Examples of the cyclic sulfone compound represented by Formula (8-1) preferably include tetramethylene sulfone (sulfolane), pentamethylene sulfone, and hexamethylene sulfone. Examples of the cyclic sulfone compound having a substituent preferably include 3-methylsulfolane and 2,4-dimethylsulfolane.

Alternatively, the sulfone compound may be chain sulfone compounds. Examples of the chain sulfone compound include ethylmethylsulfone, ethylisopropylsulfone, ethylisobutylsulfone, dimethylsulfone, and diethylsulfone. Among these, ethylmethylsulfone, ethylisopropylsulfone, and ethylisobutylsulfone are preferred.

The sulfone compounds have a compatibility with fluorinated ether compounds as well as a relatively high dielectric constant, and thus advantageously have an excellent effect of dissolving/dissociating lithium salts. Sulfone compounds may be used alone or used in combination of two or more kinds.

The content of the sulfone compound in the non-aqueous electrolytic solvent, when it is used, is preferably 1% by volume or more and 75% by volume or less, and more preferably 5% by volume or more and 50% by volume or less. Further it is more preferably 10% by volume or more and 40% by volume or less. If the sulfone compound is used in an amount of 1% by volume or more, the compatibility of the electrolyte solution increases. Whereas, containing too much of the sulfone compound may increase the viscosity of the electrolyte solution and lead to a reduction in capacity of the cycling characteristics at room temperature.

The nonaqueous electrolyte solvent may comprise the following compounds in addition to the above ones. The nonaqueous electrolyte solvent may contain, for example, γ-lactones such as γ-butyrolactone, and cyclic ethers such as tetrahydrofuran and 2-methyl tetrahydrofuran. Furthermore, the nonaqueous electrolyte solvent may also contain a compound in which a part of hydrogen atoms of the above materials are replaced with fluorine atoms. In addition, the nonaqueous electrolyte solvent may also contain an aprotic organic solvent such as dimethyl sulfoxide, 1,3-dioxolane, formamide, acetamide, dimethylformamide, dioxolane, acetonitrile, propylnitrile, nitromethane, ethyl monoglyme, trimethoxymethane, dioxolane derivatives, methylsulfolane, 1,3-dimethyl-2-imidazolidinone, 3-methyl-2-oxazolidinone, propylene carbonate derivatives, tetrahydrofuran derivatives, ethyl ether, 1,3-propane sultone, anisole, and N-methylpyrrolidone. The nonaqueous electrolyte solvent may comprise a cyclic sulfonate ester. For example, the cyclic monosulfonate ester is preferably a compound represented by the following formula (9).

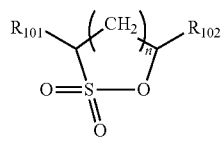

(9)

(in Formula (9), $R_{101}$ and $R_{102}$ each independently represent a hydrogen atom, a fluorine atom or alkyl group having 1 to 4 carbon atoms. n is 0, 1, 2, 3, or 4.)

For example, the cyclic disulfonate ester is preferably a compound represented by the following formula (9-1).

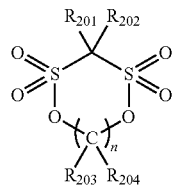

(9-1)

(in Formula (9-1), $R_{201}$ and $R_{204}$ each independently represent a hydrogen atom, a fluorine atom or alkyl group having 1 to 4 carbon atoms. n is 0, 1, 2, 3, or 4.)

Examples of the cyclic sulfonate ester include monosulfonate esters such as 1,3-propanesultone, 1,2-propanesultone, 1,4-butanesultone, 1,2-butanesultone, 1,3-butanesultone, 2,4-butanesultone, and 1,3-pentanesultone; and disulfonate esters such as methylene methane disulfonate ester and ethylene methane disulfonate ester. Among these, 1,3-propanesultone, 1,4-butanesultone, and methylene methane disulfonate ester are preferred from the viewpoint of the film-forming effect, availability, and cost.

The content of the cyclic sulfonate ester in the electrolyte solution, when it is contained, is preferably from 0.01 to 10% by mass, and more preferably from 0.1 to 5% by mass. When the content of the cyclic sulfonate ester is 0.01% by mass or more, a film on the positive electrode surface can be more effectively formed to thereby suppress decomposition of the electrolyte solution.

Examples of a supporting salt include lithium salts such as $LiPF_6$, $LiAsF_6$, $LiAlCl_4$, $LiClO_4$, $LiBF_4$, $LiSbF_6$, $LiCF_3SO_3$, $LiC_4F_9CO_3$, $LiC(CF_3SO_2)_2$, $LiN(CF_3SO_2)_2$, $LiN(C_2F_5SO_2)_2$, $LiB_{10}Cl_{10}$. Furthermore, another supporting salt includes lower aliphatic lithium carboxylate, chloroboran lithium, lithium tetraphenylborate, LiBr, LiI, LiSCN and LiCl and the like. The supporting salt may be used alone or in combinations of two or more.

Moreover, an ion conductive polymer can be added to a nonaqueous electrolyte solvent. Examples of the ion conductive polymer include polyether such as polyethylene oxide and polypropylene oxide, and polyolefin such as polyethylene and polypropylene. Examples of the ion conductive polymer include polyvinylidene fluoride, polytetrafluoroethylene, polyvinyl fluoride, polyvinyl chloride, polyvinylidene chloride, polymethylmethacrylate, polymethylacrylate, polyvinyl alcohol, polymethacrylonitrile, polyvinylacetate, polyvinylpyrrolidinone, polycarbonate, polyethylene terephthalate, polyhexamethylene adipamide, polycaprolactam, polyurethane, polyethylene imine, polybutadiene, polystyrene, polyisoprene, and derivatives thereof. The ion conductive polymer can be used singly or in combinations of two or more. A polymer containing various monomers that constitute the above-mentioned polymer may be also used.

<Positive Electrode>

In the positive electrode of the lithium secondary battery according to the present embodiment, 4V-class materials such as $LiMn_2O_4$ or $LiCoO_2$ may be used a positive electrode active material. Further, lithium-containing complex oxides such as $LiM1O_2$ (wherein M1 represents at least one element selected from the group consisting of Mn, Fe, Co and Ni, and a part of M1 may be substituted with Mg, Al or Ti) and LiMn$_{2-x}$M2$_x$O$_4$ (M2 is at least one element selected from the group consisting of Mg, Al, Co, Ni, Fe and B, and 0≤x<0.4.); and olivine type materials represented by LiFePO$_4$ may also be used.

Further, materials in which a part of the transition metal of these compounds is replaced with Al, Fe, P, Ti, Si, Pb, Sn, In, Bi, Ag, Ba, Ca, Hg, Pd, Pt, Te, Zn, La or the like; or materials in which Li is contained in an excess amount more than the stoichiometric composition in these compounds may also be used.

From the viewpoint of achieving higher energy density, a high capacity compound is preferably contained. Examples of the high capacity compound include lithium acid nickel (LiNiO$_2$), or lithium nickel composite oxides in which a part of the Ni of lithium acid nickel is replaced by another metal element, and layered lithium nickel composite oxides represented by the following formula (A) are preferred.

$$Li_yNi_{(1-x)}M_xO_2 \qquad (A)$$

wherein 0≤x<1, 0<y≤1.2, and M is at least one element selected from the group consisting of Co, Al, Mn, Fe, Ti, and B.

From the viewpoint of thermal stability, it is also preferred that the content of Ni does not exceed 0.5, that is, x is 0.5 or more in the formula (A). In addition, it is also preferred that particular transition metals do not exceed half. Examples of such compounds include Li$_\alpha$Ni$_\beta$Co$_\gamma$Mn$_\delta$O$_2$ (0<α≤1.2, preferably 1≤α≤1.2, β+γ+δ=1, 0.2≤β≤0.5, 0.1≤γ≤0.4, 0.1≤δ≤0.4). More specific examples may include LiNi$_{0.4}$Co$_{0.3}$Mn$_{0.3}$O$_2$ (abbreviated as NCM433), LiNi$_{1/3}$Co$_{1/3}$Mn$_{1/3}$O$_2$, LiNi$_{0.5}$Co$_{0.2}$Mn$_{0.3}$O$_2$ (abbreviated as NCM523), and LiNi0.5Co0.3Mn0.2O2 (abbreviated as NCM532) (also including these compounds in which the content of each transition metal fluctuates by about 10%).

In addition, from the viewpoint of high capacity, it is preferred that the content of Ni is high, that is, x is less than 0.5, further preferably 0.4 or less in the formula (A). Examples of such compounds include Li$_\alpha$Ni$_\beta$Co$_\gamma$Mn$_\delta$O$_2$ (0<α≤1.2, preferably 1≤α≤1.2, β+γ+δ=1, β≥0.7, γ≤0.2) and Li$_\alpha$Ni$_\beta$Co$_\gamma$Al$_\delta$O$_2$ (0<α≤1.2, preferably 1≤α1.2, β+γ+δ=1, β≥=0.7, γ≤0.2) and particularly include LiNi$_\beta$Co$_\gamma$Mn$_\delta$O$_2$ (0.75≤β≤0.85, 0.05≤γ≤0.15, 0.10≤δ≤0.20). More specifically, for example, LiNi$_{0.8}$Co$_{0.05}$MnO$_{0.15}$O$_2$, LiNi$_{0.8}$Co$_{0.1}$Mn$_{0.1}$O$_2$, LiNi$_{0.8}$Co$_{0.15}$Al$_{0.05}$O$_2$, and LiNi$_{0.8}$Co$_{0.1}$Al$_{0.1}$O$_2$ may be preferably used.

In addition, two or more compounds represented by the formula (A) may be mixed and used, and, for example, it is also preferred that NCM532 or NCM523 and NCM433 are mixed in the range of 9:1 to 1:9 (as a typical example, 2:1) and used. Further, by mixing a material in which the content of Ni is high (x is 0.4 or less in the formula (A)) and a material in which the content of Ni does not exceed 0.5 (x is 0.5 or more, for example, NCM433), a battery having high capacity and high thermal stability can also be formed.

Further, from the viewpoint of obtaining a high energy density, it is preferable to include an active material capable of an absorbing or releasing lithium ions at 4.5V or higher potential versus lithium metal. For example, it may be selected by the following methods, for example. First, Li metal and a positive electrode containing a positive electrode active material are opposed to each other with a separator sandwiched therebetween and placed in a battery. Then, an electrolyte solution is injected to produce the battery. When charge and discharge are performed at a constant current of, for example, 5 mAh/g per mass of the positive electrode active material of the positive electrode, the positive electrode active material having a charge-discharge capacity of 10 mAh/g or more per mass of the active material at a potential of 4.5 V or more versus lithium can be defined as the positive electrode active material operating at a potential of 4.5 V or more versus lithium. Moreover, when charge and discharge are performed at a constant current of 5 mAh/g per mass of the positive electrode active material of the positive electrode, the positive electrode active material preferably has a charge-discharge capacity of 20 mAh/g or more per mass of the active material at a potential of 4.5 V or more versus lithium, 50 mAh/g or more is more preferable, and 100 mAh/g or more is still more preferable. As for the form of the battery, a coin type can be used, for example. The positive electrode can be produced, for example, as follows.

It is preferable that the positive electrode active material comprises an active material operating at a potential of 4.5 V or more versus lithium, and in particular comprises a lithium manganese composite oxide represented by the following formula (10). The lithium manganese composite oxide represented by the following formula (10) is an active material that operates at a potential of 4.5 V or more versus lithium.

$$Li_a(M_xMn_{2-x-y}Y_y)(O_{4-w}Z_w) \qquad (10)$$

wherein 0.3≤x≤1.2, 0≤y, x+y<2, 0≤a≤1.2, and 0≤w≤1; M is at least one selected from the group consisting of Co, Ni, Fe, Cr and Cu; Y is at least one selected from the group consisting of Li, B, Na, Al, Mg, Ti, Si, K and Ca; and Z is at least one selected from the group consisting of F and Cl.

The lithium manganese composite oxide represented by the following formula (10) is preferably a compound represented by the following formula (10-1):

$$Li_a(M_xMn_{2-x-y}Y_y)(O_{4-w}Z_w) \qquad (10\text{-}1)$$

wherein 0.5≤x≤1.2, 0≤y, x+y<2, 0≤a≤1.2, and 0≤w≤1; M is at least one selected from the group consisting of Co, Ni, Fe, Cr and Cu; Y is at least one selected from the group consisting of Li, B, Na, Al, Mg, Ti, Si, K and Ca; and Z is at least one selected from the group consisting of F and Cl.

In addition, in the formula (10), M preferably includes Ni, and more preferably M is only Ni. This is because when M includes Ni, a high capacity active material is relatively easily obtained. When M consists of only Ni, x is preferably 0.4 or more and 0.6 or less from a viewpoint of obtaining a high capacity active material. Moreover, it is more preferable that the positive electrode active material is LiNi$_{0.5}$Mn$_{1.5}$O$_4$ since high capacity of 130 mAh/g or more is obtained.

Moreover, examples of the active material which is represented by the formula (10) and which operates at a potential of 4.5 V or more versus lithium include LiCrMnO$_4$, LiFeMnO$_4$, LiCoMnO$_4$, and LiCu$_{0.5}$Mn$_{1.5}$O$_4$. These positive electrode active materials have high capacity. In addition, the positive electrode active material may also have a mixed composition of these active materials and LiNi$_{0.5}$Mn$_{1.5}$O$_4$.

Furthermore, in some cases, a life can be improved by replacing a part of Mn of these active materials with Li, B, Na, Al, Mg, Ti, Si, K, Ca or the like. In short, when 0<y in a formula (10), a life may be improved. Among these, when Y is Al, Mg, Ti or Si, the effect of life improvement is high. Moreover, Y is more preferably Ti because the life improvement effect is exhibited while maintaining high capacity.

The range of y is preferably more than zero and 0.3 or less. When y is 0.3 or less, it becomes easy to suppress a decrease in capacity.

Furthermore, it is possible to replace an oxygen moiety with F or Cl. In the formula (10), when w is set to more than 0 and 1 or less, a decrease in capacity can be suppressed.

Examples of the spinel type positive electrode active material represented by the formula (10) include $LiNi_{0.5}Mn_{1.5}O_4$, $LiCr_xMn_{2-x}O_4$ ($0.4 \leq x \leq 1.1$), $LiFe_xMn_{2-x}O_4$ ($0.4 \leq x \leq 1.1$), $LiCu_xMn_{2-x}O_4$ ($0.3 \leq x \leq 0.6$), $LiCo_xMn_{2-x}O_4$ ($0.4 \leq x \leq 1.1$) and solid solutions thereof.

As the active material that operates at a potential of 4.5V or more versus lithium, olivine type compounds may also exemplified. Examples of the olivine type positive electrode active material includes $LiMPO_4$ (wherein M is at least one of Co and Ni) such as $LiCoPO_4$, $LiNiPO_4$.

Moreover, the active material operating at a potential of 4.5 V or more versus lithium also includes a Si composite oxide. Examples of the Si composite oxide include $Li_2MSiO_4$ (M: at least one of Mn, Fe and Co).

The active material operating at a potential of 4.5 V or more versus lithium also includes a material including a layer structure. Examples of the positive electrode active material including a layer structure include $Li(M1_xM2_yMn_{2-x-y})O_2$ (M1: at least one selected from the group consisting of Ni, Co and Fe; M2: at least one selected from the group consisting of Li, Mg and Al; $0.1 < x < 0.5$, $0.05 < y < 0.3$), $Li(M_{1-z}Mn_z)O_2$ (M: at least one of Li, Co and Ni, $0.7 \geq z \geq 0.33$), or $Li(Li_xM_{1-x-z}Mn_z)O_2$ (M: at least one of Co and Ni, $0.3 > x \geq 0.1$, $0.7 \geq z \geq 0.33$).

The specific surface area of the positive electrode active material such as the lithium manganese composite oxide represented by the above formula (10) is, for example, 0.01 to 5 $m^2/g$, preferably 0.05 to 4 $m^2/g$, more preferably 0.1 to 3 $m^2/g$, and still more preferably 0.2 to 2 $m^2/g$. When the specific surface area is set within such a range, a contact area with an electrolyte solution can be adjusted to a suitable range. That is, when the specific surface area is set to 0.01 $m^2/g$ or more, it becomes easy to perform intercalation and deintercalation of a lithium ion smoothly and therefore resistance can be more reduced. Moreover, when the specific surface area is set to 5 $m^2/g$ or less, it is possible to more suppress progress of decomposition of an electrolyte solution and elution of a component element of the active material.

A median particle size of the above-mentioned lithium manganese composite oxide is preferably 0.1 to 50 μm and more preferably 0.2 to 40 μm. When the particle size is 0.1 μm or more, it is possible to more suppress elution of a component element such as Mn and degradation by contact with an electrolyte solution. Moreover, when the particle size is 50 μm or less, it becomes easy to perform insertion and elimination of a lithium ion smoothly and therefore resistance can be more reduced. Measurement of a particle size can be carried out with a laser diffraction/dispersion type particle size distribution measuring apparatus.

The positive electrode active materials may be used alone or in combination of two or more.

The positive electrode active material may be, for example, those containing only the 4V-class active material described above. Further, from the viewpoint of obtaining a high energy density, it is preferable to use an active material that operates at 4.5V or more potential versus lithium, as described above. The 4V-class active material may be included.

As for a binder for positive electrode, the same agent as the binder for negative electrode can be used. Among these, from the viewpoint of versatility and low cost, polyvinylidene fluoride (PVdF) is preferable. In view of trade-off relationship between "sufficient adhesive power" and "high energy", the amount of the binder to be used for positive electrode is preferably 2 to 10 mass parts with respect to 100 mass parts of the positive electrode active material. Examples of the binder other than polyvinylidene fluoride include vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide and polyamideimide.

The positive electrode current collector is not particularly limited, but the examples thereof include aluminum, nickel, silver, or alloys thereof. As the shape thereof, foil, flat plate, mesh and the like are exemplified.

A conductive assisting agent may be added to a positive electrode active material layer containing a positive electrode active material in order to reduce impedance. The conductive assisting agent includes a carbonaceous microparticle such as graphite, carbon black, and acetylene black.

As the positive electrode, an example that may be used is those obtained by forming, on the positive electrode current collector, a positive electrode active material layer containing a positive electrode active material and a positive electrode binder.

For example, the positive electrode can be arranged to have a positive electrode current collector formed of a metal foil, and a positive electrode active material layer applied to one surface or both surfaces of the positive electrode current collector. The positive electrode active material layer is formed so as to cover the positive electrode current collector by the positive electrode binder. The positive electrode current collector is configured to have an extension part that is connected to a positive electrode terminal, and the positive electrode active material layer is not applied to this extension part.

<Negative Electrode>

The negative electrode is not particularly limited as long as a material capable of absorbing and desorbing lithium is contained therein as a negative electrode active material.

The negative electrode active material is not particularly limited, but it includes, for example, a carbon material capable of absorbing and desorbing a lithium ion (a), a metal capable of forming an alloy with lithium (b), and a metal oxide capable of absorbing and desorbing a lithium ion (c).

As a carbon material (a), graphite (natural graphite, artificial graphite, etc.), amorphous carbon, diamond-like carbon, a carbon nanotube, or a composite thereof can be used. High crystalline graphite has high electrical conductivity and excels in voltage flatness and adhesiveness with a negative electrode current collector composed of a metal such as copper. On the other hand, low crystalline amorphous carbon has a relatively lower volume expansion and therefore has large effect to relax volume expansion of the whole negative electrode. Further, degradation resulting from non-uniformity such as a crystal particle boundary and a defect rarely occurs. The carbon material (a) can be used singly or together with another active material. In the embodiments in which the carbon material is used in combination with the other materials, the content of the carbon material (a) is preferably in the range of 2 mass % or more and 80 mass % or less in the negative electrode active material, and more preferably, in the range of 2 mass % or more and 30 mass % or less.

As the metal (b), metals mainly composed of Al, Si, Pb, Sn, Zn, Cd, Sb, In, Bi, Ag, Ba, Ca, Hg, Pd, Pt, Te, or La; or an alloy containing two or more of the above metals; or an alloy of lithium with the above metals or alloys and the like can be used. In particular, it is preferred to contain silicon (Si) as the metal (b). The metal (b) can be used singly or together with another active material. The content is preferably in the range of 5 mass % or more and 90 mass % or less in the negative electrode active material, and more preferably, in the range of 20 mass % or more and 50 mass % or less.

As the metal oxide (c), silicon oxide, aluminum oxide, tin oxide, indium oxide, zinc oxide, lithium oxide, or a composite containing two or more of these oxides can be used. Especially, it is preferable to contain silicon oxide as the metal oxide (c). This is because silicon oxide is relatively stable and is hard to trigger a reaction with other compounds. Moreover, one or more of elements selected from nitrogen, boron and sulfur may also be added to the metal oxide (c) in an amount of, for example, 0.1 to 5 mass %. Thereby, electrical conductivity of the metal oxide (c) can be raised. Whereas the metal oxide (c) can be used singly or together with another active material, the content in the negative electrode active material is preferably in the range of 5 mass % or more and 90 mass % or less, and more preferably in the range of 40 mass % or more and 70 mass % or less.

Specific examples of the metal oxide (c) include, for example, $LiFe_2O_3$, $WO_2$, $MoO_2$, $SiO$, $SiO_2$, $CuO$, $SnO$, $SnO_2$, $Nb_3O_5$, $Li_xTi_{2-x}O_4$ ($1 \leq x \leq 4/3$), $PbO_2$ and $Pb_2O_5$.

Examples of another negative electrode active material include a metal sulfide (d) capable of absorbing and desorbing a lithium ion. Examples of the metal sulfide (d) include $SnS$ and $FeS_2$. In addition, examples of the negative electrode active material further include lithium metal, lithium alloy, polyacene, polythiophene, and lithium nitrides such as $Li_5(Li_3N)$, $Li_7MnN_4$, $Li_3FeN_2$, $Li_{2.5}Co_{0.5}N$ and $Li_3CoN$.

The above negative electrode active materials can be used alone or in combinations of two or more.

Moreover, the negative electrode active material may contain a carbon material (a), a metal (b) and a metal oxide (c). Hereafter, this negative electrode active material will be described.

It is preferable that a part or the whole of the metal oxide (c) have an amorphous structure. The metal oxide (c) having an amorphous structure can suppress volume expansion of the carbon material (a) and the metal (b), and can also suppress decomposition of the electrolyte solution. As a mechanism of this, it is assumed that the amorphous structure of the metal oxide (c) exerts a certain influence on film formation at the interface between the carbon material (a) and the electrolyte solution. In addition, it is considered that in the amorphous structure, factors resulting from heterogeneity such as a crystal particle boundary and a defect are relatively small. Whether a part or the whole of the metal oxide (c) has an amorphous structure can be confirmed by X-ray diffraction measurement (general XRD measurement). Specifically, when the metal oxide (c) does not have an amorphous structure, a peak intrinsic to the metal oxide (c) is observed, whereas when a part or the whole of the metal oxide (c) has an amorphous structure, the intrinsic to the metal oxide (c) is observed as a broad peak.

The metal oxide (c) is preferably an oxide of a metal which constitutes the metal (b). Moreover, it is preferable that the metal (b) and metal oxide (c) be silicon (Si) and silicon oxide (SiO), respectively.

The whole or a part of the metal (b) is preferably distributed in the metal oxide (c). When at least a part of the metal (b) is distributed in the metal oxide (c), volume expansion of the whole negative electrode can be more suppressed, and decomposition of an electrolyte solution can be also suppressed. The distribution of the whole or a part of the metal (b) in the metal oxide (c) can be observed by using a combination of transmission electron microscope observation (general TEM observation) and energy dispersion type X-ray spectroscopy measurement (general EDX measurement). Specifically, a section of a sample containing metal (b) particles is observed, and oxygen concentration of the metal (b) particles distributed in the metal oxide (c) is measured, and thereby it can be confirmed that the metal constituting the metal (b) particles does not become an oxide.

As described above, each content of the carbon material (a), metal (b) and metal oxide (c) with respect to the total of the carbon material (a), metal (b) and metal oxide (c) is preferably set to 2 mass % or more and 80 mass % or less, 5 mass % or more and 90 mass % or less, and 5 mass % or more and 90 mass % or less, respectively. In addition, each content of the carbon material (a), metal (b) and metal oxide (c) with respect to the total of the carbon material (a), metal (b) and metal oxide (c) is more preferably set to 2 mass % or more and 30 mass % or less, 20 mass % or more and 50 mass % or less, and 40 mass % or more and 70 mass % or less, respectively.

The negative electrode active material, in which the whole or a part of the metal oxide (c) has an amorphous structure and the metal (b) is wholly or partially distributed in the metal oxide (c), can be produced by, for example, the method disclosed in the Japanese Patent Laid-Open No. 2004-47404. Specifically, the metal oxide (c) is subjected to CVD processing under the atmosphere containing organic compound gas such as methane gas, so that a composite in which the metal (b) in the metal oxide (c) turns to a nanocluster and whose surface is covered with the carbon material (a) can be obtained. In addition, the above-mentioned negative electrode active material can be also produced by mixing the carbon material (a), metal (b) and metal oxide (c) with a mechanical milling.

The carbon material (a), metal (b) and metal oxide (c) are not particularly limited, but a particle-shaped one can be used, respectively. For example, an average particle size of the metal (b) may be set to be smaller than that of the carbon material (a) and that of the metal oxide (c). In this case, the metal (b) having a large volume change during charge and discharge forms a relatively small particle, and the carbon material (a) and metal oxide (c) having a small volume change forms a relatively large particle, and therefore dendrite generation and micropowderization of the alloy are suppressed more effectively. Moreover, in process of charge and discharge, absorption and desorption of lithium is performed in order of particles with large diameter, particles with small diameter, and particles with large diameter. Also from this point, residual stress and residual distortion are suppressed. The average particle size of the metal (b) can be, for example, 20 μm or less, and preferably 15 μm or less.

Moreover, an average particle size of the metal oxide (c) is preferably ½ or less of that of the carbon material (a), and an average particle size of the metal (b) is preferably ½ or less of that of the metal oxide (c). Furthermore, it is more preferable that an average particle size of the metal oxide (c) be ½ or less of that of the carbon material (a) and further that the average particle size of the metal (b) be ½ or less of that of the metal oxide (c). When an average particle size is controlled in such a range, relaxation effect on volume expansion of the metal and alloy phase can be obtained more effectively, and thus it is possible to obtain a secondary battery having excellent energy density and excellent balance of cycle life and efficiency. More specifically, it is preferable that an average particle size of the silicon oxide (c) be ½ or less of that of graphite (a) and that an average particle size of silicon (b) be ½ or less of that a silicon oxide (c). Still more specifically, the average particle size of silicon (b) can be, for example, 20 μm or less and preferably 15 μm or less.

Graphite whose surface is covered with a low crystalline carbon material can be used as a negative electrode active material. By covering the graphite surface with a low crystalline carbon material, even when graphite having high energy density and high electrical conductivity is used as a negative electrode active material, reaction of the negative electrode active material and the electrolyte solution can be suppressed. Therefore, by using graphite covered with a low crystalline carbon material as a negative electrode active material, a capacity retention ratio can be improved and a capacity of the battery can be also improved.

In the low crystalline carbon material that covers a graphite surface, a ratio $I_D/I_G$ is preferably 0.08 or more and 0.5 or less, in which the $I_D/I_G$ represents a ratio of a peak intensity ID of D peak generated in the range of 1300 $cm^{-1}$ to 1400 $cm^{-1}$ in Raman spectrum obtained by laser Raman analysis with respect to a peak intensity $I_G$ of G peak generated in the range of 1550 $cm^{-1}$ to 1650 $cm^{-1}$. Generally, a carbon material with high crystallinity shows a low $I_D/I_G$ value, and carbon with low crystallinity shows a high $I_D/I_G$ value. When $I_D/I_G$ is 0.08 or more, even in the case of operation at a high voltage, reaction of graphite with the electrolyte solution can be suppressed, and the capacity retention ratio of the battery can be improved. When $I_D/I_G$ is 0.5 or less, the battery capacity can be increased. Moreover, $I_D/I_G$, is more preferably 0.1 or more and 0.4 or less.

For the laser Raman analysis of the low crystalline carbon material, for example, an argon-ion laser Raman analysis apparatus can be used. In the case of a material with large laser absorption such as a carbon material, a laser is absorbed within up to several 10 nm from the surface. Therefore, the laser Raman analysis on the graphite whose surface is covered with the low crystalline carbon material substantially provides information of the low crystalline carbon material deposited on the surface.

In value or $I_G$ value can be calculated from, for example, laser Raman spectrum measured by the following condition.
Laser Raman spectrum equipment: Ramanor T-64000 (Jobin Yvon/manufactured by Atago Bussan Co., Ltd.)
Measurement mode: Macroraman
Measurement arrangement: 60°
Diameter of beam: 100 μm
Light source: Ar+ laser/514.5 nm
Laser power: 10 mW
Diffraction grating: Single 600 gr/mm
Distribution: Single 21 A/mm
Slit: 100 μm
Detector: CCD/Jobin Yvon 1024256

The graphite covered with a low crystalline carbon material can be obtained, for example, by covering a particulate graphite with the low crystalline carbon material. The average particle size (volume average: $D_{50}$) of the graphite particles is preferably 5 μm or more and 30 μm or less. The graphite preferably has crystallinity, and the $I_D/I_G$ value of the graphite is more preferably 0.01 or more and 0.08 or less.

The thickness of the low crystalline carbon material is preferably 0.01 μm or more and 5 μm or less, and more preferably 0.02 μm or more and 1 μm or less.

The average particle size ($D_{50}$) can be measured using, for example, a laser diffraction/dispersion type particle diameter/size distribution measuring apparatus Microtrac MT3300EX (Nikkiso Co., Ltd.).

The low crystalline carbon material can be formed on the surface of graphite by using, for example, a gaseous phase method in which hydrocarbon such as propane and acetylene is thermally decomposed to deposit carbon. Also, the low crystalline carbon material can be formed by using, for example, a method in which pitch, tar or the like is adhered onto the surface of graphite and calcined at 800 to 1500° C.

As for graphite, $d_{002}$, the layer distance of (002) plane is preferably 0.33 nm or more and 0.34 nm or less in a crystal structure, and is more preferably 0.333 nm or more and 0.337 nm or less, and is still more preferably, 0.336 nm or less. Graphite with such a high crystallinity has high lithium intercalation capacity, and an improvement in charge-discharge efficiency can be expected.

The layer distance of graphite can be measured by, for example, X-ray diffraction.

The specific surface area of the graphite covered with the low crystalline carbon material is, for example, 0.01 to 20 $m^2/g$, preferably 0.05 to 10 $m^2/g$, more preferably 0.1 to 5 $m^2/g$, and still more preferably 0.2 to 3 $m^2/g$. When the specific surface area of the graphite covered with the low crystalline carbon material is set to 0.01 $m^2/g$ or more, insertion and release of a lithium ion tends to be performed smoothly, and thus the resistance can be more decreased. When the specific surface area of the graphite covered with the low crystalline carbon material is set to 20 $m^2/g$ or less, decomposition of the electrolyte solution can be more suppressed, and elution of component elements of the active material to the electrolyte solution can be more suppressed.

The graphite used as substrate material is preferably a high crystallinity one. For example, synthetic graphite and natural graphite can be used, but it is not limited to them. As for a material of the low crystalline carbon, for example, coal tar, a pitch coke and phenol based resin may be used, in a mixture with high crystalline carbon. The material of the low crystalline carbon is mixed in 5 to 50 mass % with respect to the high crystalline carbon to prepare the mixture. After the mixture is heated at 150° C. to 300° C., heat treatment is further performed at 600° C. to 1500° C. Thereby, a surface-treated graphite whose surface is covered with the low crystalline carbon can be obtained. It is preferable to carry out the heat treatment in an inert gas atmosphere such as argon, helium and nitrogen.

The negative electrode active material may contain another active material in addition to the graphite covered with the low crystalline carbon material.

Examples of the negative electrode binder include, but not particulaly limited, polyvinylidene fluoride, vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide, polyamideimide and polyacrylic acid.

The amount of the negative electrode binder is preferably 1 to 30 mass %, more preferably 2 to 25 mass % based on total mass of the negative electrode active material and the negative electrode binder. With 1 mass % or more, adhesion between the active materials or between the active material and a current collector is improved and therefore cycle characteristic becomes excellent. With 30 mass % or less, a content ratio of the active material is increased to improve the capacity of the negative electrode.

A negative electrode current collector is not particularly limited. In view of electrochemical stability, aluminum, nickel, copper, silver, and an alloy thereof are preferable. As the shape thereof, foil, flat plate, mesh and the like are exemplified.

The negative electrode can be produced by forming a negative electrode active material layer on a negative electrode current collector, wherein the negative electrode active material layer contains a negative electrode active material and a binder. The forming method of the negative electrode active material layer includes a doctor blade method, a die coater method, a CVD method and a sputtering method and the like. After forming the negative electrode active material layer in advance, a thin film of aluminum, nickel or an alloy thereof may be formed as a negative electrode current collector by a method such as vapor deposition and sputtering.

As the negative electrode, an example that may be used is those obtained by forming, on the negative electrode current collector, a negative electrode active material layer containing a negative electrode active material and a negative electrode binder.

For example, the negative electrode can be arranged to have a negative electrode current collector formed of a metal foil, and a negative electrode active material layer applied to one surface or both surfaces of the positive electrode current collector. The negative electrode active material layer is formed so as to cover the negative electrode current collector by the negative electrode binder. The negative electrode current collector is configured to have an extension part that is connected to a negative electrode terminal, and the negative electrode active material layer is not applied to this extension part.

<Separator>

The secondary battery can be constituted by a combination of a positive electrode, a negative electrode, a separator and a nonaqueous electrolyte. Examples of a separator include: a woven or nonwoven fabric; a porosity polymer film such as polyolefin (such as polyethylene and polypropylene), polyimide, porosity polyvinylidene fluoride film; and an ion conductive polymer electrolyte film. These can be used alone or in combination.

(The Shape of the Battery)

Examples of the shape of the battery include a cylinder type, a square type, a coin type, a button type and a laminated type. Examples of an outer package of the battery include stainless steel, iron, aluminum, titanium and an alloy thereof or a plating-processed product thereof and the like. Examples of the plating include nickel plating.

Examples of a laminate resin film used for a laminate type include aluminium, an aluminium alloy and a titanium foil. Examples of a material of heat melt-adhesion part of the metal laminated resin film include thermoplastic polymer materials such as polyethylene, polypropylene and polyethylene terephthalate. Moreover, the metal laminate resin layer and the metallic foil layer are respectively not limited to a single layer, and two or more layers may be formed.

An outer package can be appropriately selected as long as it has stability in an electrolyte solution and sufficient steam barrier properties. For example, in the case of a laminate type secondary battery, laminate films, such as polypropylene, polyethylene or the like coated with aluminium or silica can be used as the outer package. In particular, it is preferable to use an aluminium laminate film from a viewpoint of suppressing volume expansion.

Herein below, a lithium ion secondary battery of the stacked laminate-type is explained as an example of the secondary battery according to the present embodiment. The present invention is not necessarily limited to stacked type batteries and is also applicable to a battery, such as a wound type.

Figure 2:
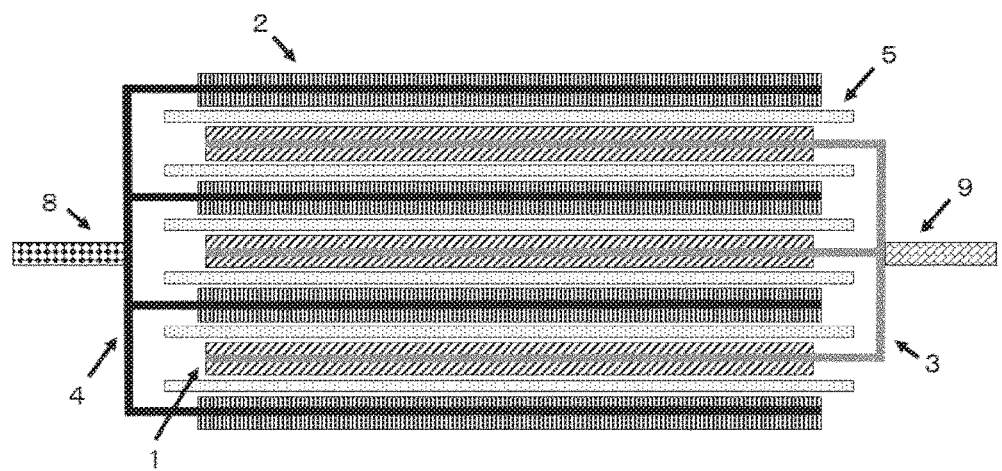
FIG. 2 is a schematic sectional view showing the structure of an electrode element of a multilayer laminate type secondary battery according to an embodiment of the present invention.

FIG. 1 is a schematic diagram showing an example of the basic structure of a secondary battery according to the present embodiment. In the positive electrode, a positive electrode active material layer 1 is formed on a positive electrode current collector 3. In the negative electrode, a negative electrode active material layer 2 is formed on a negative electrode current collector 4. These positive electrode and negative electrode are disposed so as to face each other with a porous separator 5 between them. The porous separator 5 is disposed generally parallel to the positive electrode active material layer 1 and the negative electrode active material layer 2. The electrode element (also referred to as "battery element") formed by stacking the positive electrode and the negative electrode via the separator, and the electrolyte solution are enclosed in packages 6 and 7. A positive electrode tab 9 that is connected to the positive electrode current collector 3, and a negative electrode tab 8 that is connected to the negative electrode current collector 4 are drawn out of the package. As shown in FIG. 2, the electrode element may have preferably an arrangement in which a plurality of positive electrodes and a plurality of negative electrodes are stacked via separators. In addition, the positive electrode active material layer 1 and the negative electrode active material layer 2 may be provided on both surfaces of the current collectors, respectively.

Figure 3:
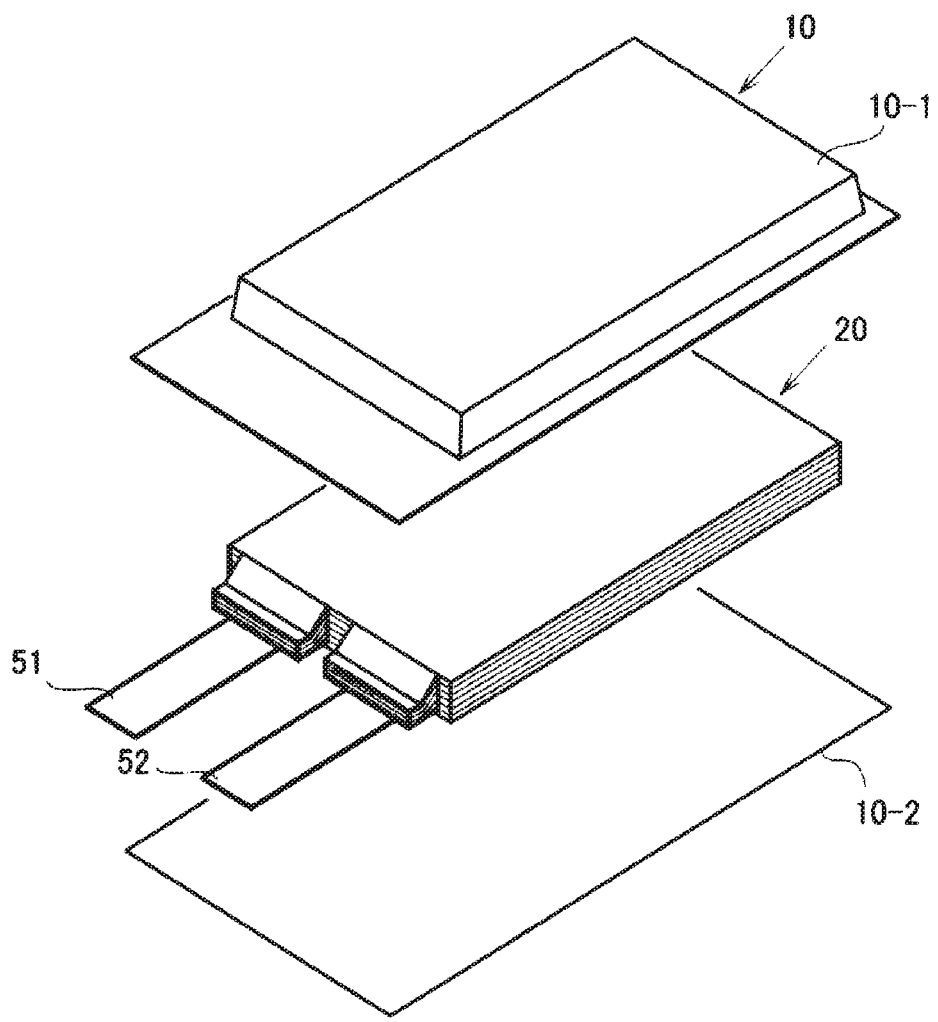
FIG. 3 is an exploded perspective view showing the basic structure of film-package battery.
Figure 4:
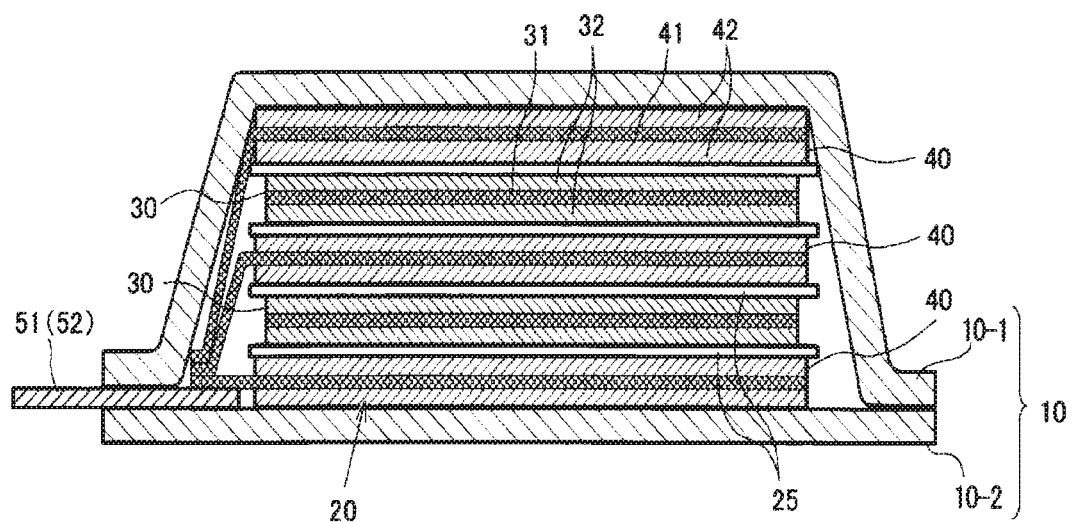
FIG. 4 is a schematic sectional view showing the battery of FIG. 3.

As another embodiment, a secondary battery having a structure as shown in FIG. 3 and FIG. 4 may be provided. This secondary battery comprises a battery element 20, a film package 10 housing the battery element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween as shown in FIG. 4. In the positive electrode 30, an electrode material 32 is applied to both surfaces of a metal foil 31, and also in the negative electrode 40, an electrode material 42 is applied to both surfaces of a metal foil 41 in the same manner.

In the secondary battery in FIG. 1, the electrode tabs are drawn out on both sides of the package, but a secondary battery to which the present invention may be applied may have an arrangement in which the electrode tabs are drawn out on one side of the package as shown in FIG. 3. Although detailed illustration is omitted, the metal foils of the positive electrodes and the negative electrodes each have an extended portion in part of the outer periphery. The extended portions of the negative electrode metal foils are brought together into one and connected to the negative electrode tab 52, and the extended portions of the positive electrode metal foils are brought together into one and connected to the positive electrode tab 51 (see FIG. 4). The portion in which the extended portions are brought together into one in the stacking direction in this manner is also referred to as a "current collecting portion" or the like.

The film package 10 is composed of two films 10-1 and 10-2 in this example. The films 10-1 and 10-2 are heat-sealed to each other in the peripheral portion of the battery element 20 and hermetically sealed. In FIG. 3, the positive electrode tab 51 and the negative electrode tab 52 are drawn out in the same direction from one short side of the film package 10 hermetically sealed in this manner.

Of course, the electrode tabs may be drawn out from different two sides respectively. In addition, regarding the arrangement of the films, in FIG. 3 and FIG. 4, an example in which a cup portion is formed in one film 10-1 and a cup portion is not formed in the other film 10-2 is shown, but other than this, an arrangement in which cup portions are formed in both films (not illustrated), an arrangement in which a cup portion is not formed in either film (not illustrated), and the like may also be adopted.

The secondary battery according to the present invention may be formed into an assembled battery by combining plurality batteries. The secondary battery and the assembled battery of the present invention are suitably used in applications such as electricity storage systems, batteries for vehicle applications or the like.

EXAMPLES

Hereafter, there will be described specific examples to which the present invention is applied, but the scope of the present invention is not limited to these Examples, and the present invention can be embodied with appropriate modification within the scope of the present invention. FIG. 1 is a schematic diagram showing the structure of the lithium secondary battery produced in this Example.

As shown in FIG. 1, a lithium secondary battery has: a positive electrode active material layer 1 containing a positive electrode active material on a positive electrode current collector 3 made of metal such as aluminium foil; and a negative electrode active material layer 2 containing a negative electrode active material on a negative electrode current collector 4 made of metal such as copper foil. The positive electrode active-material layer 1 and negative electrode active-material layer 2 are arranged so as to face each other interposing an electrolyte solution and a separator 5 made of nonwoven fabric, polypropylene microporous film and the like which contains the electrolyte solution. In FIG. 1, numerals 6 and 7 show an outer package, 8 shows a negative electrode tab, and 9 shows a positive electrode tab.

Example 1

The positive electrode active material of the present Example was produced in the following manner. As raw materials, materials selected from $MnO_2$, $NiO$, $Fe_2O_3$, $TiO_2$, $B_2O_3$, $CoO$, $Li_2CO_3$, $MgO$, $Al_2O_3$ and $LiF$ were weighed so as to be a desired metal composition ratio, and then grinded and mixed. The powder after mixing the raw materials was calcined for 8 hours at a calcination temperature of 500 to 1000° C. to prepare $LiNi_{0.5}Mn_{1.5}O_4$. $LiNi_{0.5}Mn_{1.5}O_4$ (90 mass %) as a positive electrode active material, polyvinylidene fluoride (PVDF) (5 mass %) as a binder, and carbon black (5 mass %) as an electric conductive agent were mixed to obtain a positive electrode mixture. The positive electrode mixture is dispersed in N-methyl-2-pyrrolidone to prepare slurry for positive electrode. This slurry for positive electrode was uniformly applied to one side of a 20 μm thick current collector made of aluminum. The thickness of the applied film was adjusted so that the initial charge capacity per unit area was set to 2.5 $mAh/cm^2$. After drying the resultant, compression molding was carried out by a roll press to produce a positive electrode.

For a negative electrode active material, artificial graphite coated with a low crystalline carbon material was used. The artificial graphite was dispersed in a solution in which PVDF was dissolved into N-methylpyrrolidone to prepare slurry for negative electrode. The mass ratio of the negative electrode active material and the binder was set to 90/10. This slurry for negative electrode was uniformly applied on a Cu current collector having a thick of 10 μm. After drying, compression molding was carried out by a roll press to produce a negative electrode.

The positive electrode and negative electrode which were cut to 3 cm×3 cm were arranged via a separator so as to be faced with each other. Five sheets of the positive electrode and six sheets of the negative electrode were stacked alternately. A fine porosity polypropylene film with 25 μm thickness was used for a separator.

As a nonaqueous electrolyte solvent, a mixed solvent containing ethylene carbonate (EC), tris(2,2,2-trifluoroethyl) phosphate (TTFEP) and fluorine-containing openchain ether (1,1,2,2-tetrafluoroethyl 2,2,3,3-tetrafluoropropyl ether) (TFETFPE) was used. $LiPF_6$ was dissolved in a concentration of 1 mol/l into this nonaqueous electrolyte solvent to prepare an electrolyte solution. Hereafter, this solvent is also referred to as solvent EC/TTFEP/TFETFPE. The volume ratio is 3/4/3, respectively. To this, 1 vol % of acetic anhydride (1.08 g/ml (20° C.)) was added.

The above-mentioned positive electrode, negative electrode, separator and electrolyte solution were placed in a laminate outer package, and the laminate was sealed to produce a lithium secondary battery. Tabs were connected to the positive electrode and negative electrode that were electrically connected from the outside of the laminate.

First, charge and discharge were performed under the following charge condition.

Charge condition: a constant current constant voltage method, charge end voltage 4.75 V, charge current 20 mA, the total charge time 2.5 hours Discharge condition: constant current discharge, discharge end voltage 3.0 V, discharge current 95 mA Next, charge-discharge cycle test was carried out at a temperature of 45° C. under the following condition.

Charge condition: a constant current constant voltage method, charge end voltage 4.75 V, charge current 95 mA, the total charge time 2.5 hours Discharge condition: constant current discharge, discharge end voltage 3.0 V, discharge current 95 mA The discharge capacity after 50 cycles at 45° C. was 76 mAh, the cell swelling ratio by gas generation was 2%, and electric resistance between the positive and negative electrodes at the charging state was 1.4Ω. In addition, the discharge capacity after 100 cycles was 68 mAh. Cell swelling ratio (%) is the ratio of the volume increase after 50 cycles relative to the cell volume after fabricated.

Comparative Example 1

A secondary battery was produced in the same manner as in Example 1 except that a mixed solvent of EC/TTFEP/TFETFPE (3/4/3 (volume ratio)) was used as a nonaqueous electrolyte solvent, and that no additive ((acid anhydride) was added.

The discharge capacity after 50 cycles at 45° C. was 74 mAh, the cell swelling ratio by gas generation was 2%, and electric resistance between the positive and negative electrodes at the charging state was 1.6Ω.

Comparative Example 2

A secondary battery was produced in the same manner as in Example 1 except that a mixed solvent of EC/TTFEP (3/7 (volume ratio)) was used as a nonaqueous electrolyte solvent to which 1 vol % of acetic anhydride was added.

The discharge capacity after 100 cycles at 45° C. was 60 mAh that was 88% of Example 1, the cell swelling ratio by gas generation after 50 cycles was 2%, and electric resistance between the positive and negative electrodes at the charging state was 3.2Ω.

Comparative Example 3

A secondary battery was produced in the same manner as in Example 1 except that a mixed solvent of EC/TTFEP (3/7 (volume ratio)) was used as a nonaqueous electrolyte solvent, and that no additive was added.

The discharge capacity after 100 cycles at 45° C. was 64 mAh that was 94% of Example 1, the cell swelling ratio by gas generation after 50 cycle was 1%, and electric resistance between the positive and negative electrodes at the charging state was 3.1Ω.

Comparative Example 4

A secondary battery was produced in the same manner as in Example 1 except that a mixed solvent of EC/DEC (3/7 (volume ratio)) was used as a nonaqueous electrolyte solvent to which 1 vol % of acetic anhydride was added.

The discharge capacity after 50 cycles at 45° C. was 65 mAh that was 86% of Example 1, the cell swelling ratio by gas generation was 29%, and electric resistance between the positive and negative electrodes at the charging state was 1.1Ω.

Comparative Example 5

A secondary battery was produced in the same manner as in Example 1 except that a mixed solvent of EC/DEC (3/7 (volume ratio)) was used as a nonaqueous electrolyte solvent, and that no additive was added.

The discharge capacity after 50 cycles at 45° C. was 7 mAh that was 9% of Example 1, the cell swelling ratio by gas generation was 354%, and electric resistance between the positive and negative electrodes at the charging state was 14Ω.

Comparative Example 6

A secondary battery was produced in the same manner as in Example 1 except that a mixed solvent of EC/PC (propylene carbonate)/TFETFPE (15/15/70 (volume ratio)) was used as a nonaqueous electrolyte solvent to which 1 vol % of acetic anhydride was added.

The discharge capacity after 50 cycles at 45° C. was 71 mAh that was 93% of Example 1, the cell swelling ratio by gas generation was 12%, and electric resistance between the positive and negative electrodes at the charging state was 1.7Ω.

Comparative Example 7

A secondary battery was produced in the same manner as in Example 1 except that a mixed solvent of EC/PC/TFETFPE (15/15/70 (volume ratio)) was used as a nonaqueous electrolyte solvent, and that no additive was added.

The discharge capacity after 50 cycles at 45° C. was 73 mAh that was 96% of Example 1, the cell swelling ratio by gas generation was 10%, and electric resistance between the positive and negative electrodes at the charging state was 1.8Ω.

Comparative Example 8

A secondary battery was produced in the same manner as in Example 1 except that a mixed solvent of EC/PC/DEC (15/15/70 (volume ratio)) was used as a nonaqueous electrolyte solvent to which 1 vol % of acetic anhydride was added.

The discharge capacity after 50 cycles at 45° C. was 64 mAh that was 84% of Example 1, the cell swelling ratio by gas generation was 15%, and electric resistance between the positive and negative electrodes at the charging state was 1.3Ω.

Comparative Example 9

A secondary battery was produced in the same manner as in Example 1 except that a mixed solvent of EC/PC/DEC (15/15/70 (volume ratio)) was used as a nonaqueous electrolyte solvent, and that no additive was added.

The discharge capacity after 50 cycles at 45° C. was 23 mAh that was 30% of Example 1, the cell swelling ratio by gas generation was 170%, and electric resistance between the positive and negative electrodes at the charging state was 4.8Ω.

With respect to the discharge capacity retention ratio after charge-discharge cycles, Example 1 is the best that includes TTFEP, TFETFPE and acetic anhydride. Here, in the case of the electrolyte solution containing only one of TTFEP and TFETFPE, the addition of acetic anhydride lowered the discharge capacity retention ratio. In contrast to this, we obtained the unexpected results that the discharge capacity retention ratio by the addition of acetic anhydride is improved only if TTFEP and TFETFPE are contained. The electrolyte solution containing TFETFPE and TTFEP and acetic anhydride shows good results compared with the levels other electrolyte solutions. This result is an effect that cannot be obtained by the electrolyte solutions which do not contain both of TFETFPE and TTFEP.

With respect to the cell swelling ratio, in the case of the electrolyte solution containing only one of TTFEP and TFETFPE, gas swelling ratio is increased by the addition of acetic anhydride. In contrast to this, significant improvement is shown in Example 1 containing TTFEP, TFETFPE and acetic anhydride.

In particular, the comparison of Example 1 and Comparative Examples 1 to 9 has revealed that Example 1 containing three components of TTFEP, TFETFPE and acetic anhydride can maintain the highest discharge capacity even after charging-discharging cycles at high temperature conditions while minimizing gas generation.

While the reason of the effects is not known, since the electric resistance is suppressed to the low level after 50 cycles, it is presumed that the coating film from TFETFPE, TTFEP and acetic anhydride is formed on the electrode, which functions to protect the electrode and suppress the decomposition of the electrolyte solution. However, this is only a speculation and is never intended to limit the present invention.

Example 2

To a mixture of EC/PC/sulfolane (SL)/TFETFPE/TTFEP=5/5/20/40/30 (volume ratio), 2 vol % of acetic anhydride was added. $LiPF_6$ was dissolved in a concentration of 0.9 mol/l into this nonaqueous electrolyte solvent to prepare an electrolyte solution, and a secondary battery was produced in the same manner as in Example 1.

The discharge capacity after 100 cycles at 55° C. was 60 mAh and the cell swelling ratio was 6%.

Comparative Example 10

A secondary battery was produced in the same manner as in Example 2 except that acetic anhydride was not added.

The discharge capacity after 100 cycles at 55° C. was 60 mAh that is the same as Example 2 and the cell swelling ratio was 17%.

A comparison of Example 2 and Comparative Example 10 has revealed that the addition of 2 vol % of acetic anhydride can reduce the cell swelling ratio significantly, while maintaining the discharge capacity.

Example 3

The artificial graphite was dispersed in a solution in which aqueous binder (styrene-butadiene rubber) was dissolved into N-methylpyrrolidone to prepare slurry for negative electrode. This slurry for negative electrode was uniformly applied on a Cu current collector having a thick of 10 μm. After drying, compression molding was carried out by a roll press to produce a negative electrode.

$LiPF_6$ was dissolved in a concentration of 0.88 mol/l into a nonaqueous electrolyte solvent of EC/PC/SL/TFETFPE/TTFEP=5/5/20/40/30 to prepare an electrolyte solution. Difluoroacetic anhydride (1.4 g/ml (20° C.)) was added in an amount of 1 vol % to this electrolyte solution. A secondary battery was produced in the same manner as in Example 1 except that the above negative electrode and the electrolyte solution were used.

The discharge capacity after 100 cycles at 55° C. was improved by 2% compared with the case where an acid anhydride was not added, and cell swelling ratio was significantly improved to 46% of the case where an acid anhydride was not added.

Example 4

$LiPF_6$ was dissolved in a concentration of 0.88 mol/l into a nonaqueous electrolyte solvent of EC/PC/SL/TFETFPE/TTFEP=5/5/20/40/30 to prepare an electrolyte solution. 3H-perfluoropropanoic anhydride (1.56 g/ml (22° C.)) was added in an amount of 1 vol % to this electrolyte solution. Using the same negative electrode as Example 3, a secondary battery was produced in the same manner as in Example 1.

The discharge capacity after 100 cycles at 55° C. was improved by 4% compared with the case where an acid anhydride was not added, and cell swelling ratio was significantly improved to 58% of the case where an acid anhydride was not added.

Example 5

$LiPF_6$ was dissolved in a concentration of 0.88 mol/l into a nonaqueous electrolyte solvent of EC/PC/SL/TFETFPE/TTFEP=5/5/20/40/30 to prepare an electrolyte solution. 3,3,3-trifluoropropionic anhydride (1.62 g/ml (45° C.)) was added in an amount of 1 vol % to this electrolyte solution. Using the same negative electrode as Example 3, a secondary battery was produced in the same manner as in Example 1.

The discharge capacity after 100 cycles at 55° C. was improved by 0.3% compared with the case where an acid anhydride was not added, and cell swelling ratio was significantly improved to 52% of the case where an acid anhydride was not added.

Examples 3, 4 and 5 are examples in which fluorinated acid anhydrides were used, wherein the discharge capacity is improved, and the amount of gas generation is significantly improved.

These results shows that the electrolyte solutions of the present invention are suitable for secondary batteries operating at high voltage of 4.6 V or higher, and thus, it is clear that they are also effective in using positive electrode materials having the high potential of the same level such as $LiCoPO_4$, $Li(Co_{0.5}Mn_{0.5})O_2$, $Li(Li_{0.2}M_{0.3}Mn_{0.5})O_2$ (wherein M is at least one of Co and Ni). Further, it is clear that by the use of the electrolyte solution according to the present invention, effects of improving the discharge capacity and suppressing the gas generation can be similarly obtained in the cases where general 4V class positive electrode materials or a negative electrode that is not mentioned herein are used.

Although the present invention has been described with reference to embodiments and examples, the present invention is not limited to the above embodiments and examples. The configuration and details of the present invention may be changed variously within the scope of the present invention to the extent that a person skilled in the art can understand.

The present application claims priority based on Japanese Patent Application No. 2014-147356, filed on Jul. 18, 2014, the entire contents of which are incorporated herein by reference.

INDUSTRIAL APPLICABILITY

The secondary battery or the battery assembly according to an embodiment of the present invention may be applied to, for example, driving devices such as electric vehicles and plug-in hybrid vehicles, electric motorcycles, motor-assisted bicycles; tools such as power tools; electronic devices such as mobile terminals and note type personal computers; and storage batteries such as home-use storage systems and solar power generation systems.

EXPLANATION OF REFERENCE

1 Positive electrode active material layer
2 Negative electrode active material layer
3 Positive electrode current collector
4 Negative electrode current collector
5 Separator
6 Laminate package
7 Laminate package
8 Negative electrode tab
9 Positive electrode tab
10 Film package
20 Battery element
25 Separator
30 Positive electrode
40 Negative electrode

The invention claimed is:

1. A nonaqueous electrolyte solution comprising a nonaqueous electrolyte solvent which comprises a fluorine-containing phosphate ester represented by following formula (1), a fluorine-containing ether represented by following formula (2), a cyclic sulfone compound represented by following formula (8-1), and an open-chain acid anhydride, wherein a content of the fluorine-containing phosphate ester is 5 vol % or more and 95 vol % or less in the nonaqueous electrolyte solvent, and a part or all of hydrogen atoms of the acid anhydride is replaced with fluorine atom;

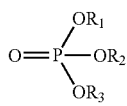  (1)

wherein $R_1$, $R_2$ and $R_3$ are the same fluorine-containing alkyl groups,

A—O—B  (2)

wherein A and B are each independently substituted or unsubstituted alkyl group, and at least one of A and B is a fluorine-containing alkyl group,

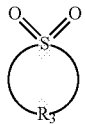  (8-1)

wherein, $R_3$ represents a substituted or unsubstituted alkylene group.

2. The nonaqueous electrolyte solution according to claim 1, wherein a content of the fluorine-containing ether is 5 vol % or more and 70 vol % or less in the nonaqueous electrolyte solvent.

3. The nonaqueous electrolyte solution according to claim 1, wherein a content of the acid anhydride is 0.01 mass % or more and 5 mass % or less in the nonaqueous electrolyte solvent.

4. The nonaqueous electrolyte solution according to claim 1, wherein the acid anhydride is a carboxylic acid anhydride having —(C=O)—O—(C=O)— structure.

5. The nonaqueous electrolyte solution according to claim 1, wherein $R_1$, $R_2$ and $R_3$ in formula (1) are fluorine-containing alkyl groups in which 50% or more of hydrogen atoms contained in a corresponding unsubstituted alkyl group are replaced with fluorine atoms; the numbers of carbon atoms of $R_1$, $R_2$ and $R_3$ in formula (1) are 1 or more and 4 or less; A and B in formula (2) are fluorine-containing alkyl groups in which 50% or more of hydrogen atoms contained in the corresponding unsubstituted alkyl groups are replaced with fluorine atoms; the numbers of carbon atoms of A and B in formula (2) are each independently 1 or more and 6 or less; and the number of carbon atoms of $R_3$ in formula (8-1) is 4 or more and 9 or less.

6. The nonaqueous electrolyte solution according to claim 1, wherein the nonaqueous electrolyte solvent further comprises a cyclic carbonate.

7. The nonaqueous electrolyte solution according to claim 6, wherein the cyclic carbonate is selected from the group consisting of ethylene carbonate, propylene carbonate, butylene carbonate, and vinylene carbonate, and compounds in which a part or all of hydrogen atoms thereof are replaced with fluorine atoms.

8. The nonaqueous electrolyte solution according to claim 1, wherein the nonaqueous electrolyte solvent further comprises a open-chain carbonate.

9. The nonaqueous electrolyte solution according to claim 8, wherein the open-chain carbonate is selected from the group consisting of dimethyl carbonate, diethyl carbonate, ethyl methyl carbonate and dipropyl carbonate, and compounds in which a part or all of hydrogen atoms thereof are replaced with fluorine atoms.

10. A secondary battery comprising a positive electrode containing a positive electrode active material, a negative electrode containing a negative electrode active material, and the electrolyte solution according to claim 1.

11. The secondary battery according to claim 10, wherein the positive electrode active material comprises a lithium manganese composite oxide represented by following formula (3), $$Li_a(M_xMn_{2-x-y}Y_y)(O_{4-w}Z_w)$$  (3)

wherein $0.5 \leq x \leq 1.2$, $0 \leq y$, $x+y<2$, $0 \leq a \leq 1.2$, and $0 \leq w \leq 1$; M is at least one selected from the group consisting of Co, Ni, Fe, Cr and Cu; Y is at least one selected from the group consisting of Li, B, Na, Al, Mg, Ti, Si, K and Ca; and Z is at least one selected from the group consisting of F and Cl.

12. The secondary battery according to claim 11, wherein the lithium manganese composite oxide comprises at least Ni as M in the formula (3).

13. The secondary battery according to claim 10, wherein the positive electrode active material comprises a lithium metal composite oxide represented by following formulae (4), (5) and (6);

$$LiMPO_4$$  (4)

wherein in the formula (4), M is at least one of Co and Ni;

$$Li(M_{1-z}Mn_z)O_2$$  (5)

wherein in the formula (5), $0.7 \geq z \geq 0.33$ and M is at least one of Li, Co and Ni; and $$Li(Li_xM_{1-x-z}Mn_z)O_2$$  (6)

wherein in the formula (6), $0.3 > x \geq 0.1$, $0.7 \geq z \geq 0.33$, M is at least one of Co and Ni.

14. The secondary battery according to claim 10 comprising a package enclosing the positive electrode, the negative electrode and the electrolyte solution, wherein the package is formed of an aluminum laminate.

15. The secondary battery according to claim 10, which is a laminate secondary battery.

16. The secondary battery according to claim 10, wherein the negative electrode active material comprises a graphite whose surface is covered with a low crystalline carbon material.

17. The nonaqueous electrolyte solution according to claim 1, wherein the content of the fluorine-containing phosphate ester in the nonaqueous electrolyte solvent is 25 vol % or more and 95 vol % or less.

18. The nonaqueous electrolyte solution according to claim 1, wherein the fluorine-containing phosphate ester is selected from the group consisting of tris(trifluoromethyl) phosphate, tris(trifluoroethyl) phosphate, tris(tetrafluoropropyl) phosphate, tris(pentafluoropropyl) phosphate, tris(heptafluorobutyl) phosphate, and tris(octafluoropentyl) phosphate.

19. The nonaqueous electrolyte solution according to claim 1, wherein the content of the cyclic sulfone compound in the nonaqueous electrolyte solvent is 10 vol % or more.

20. A method of producing a nonaqueous electrolyte solution comprising a nonaqueous electrolyte solvent, comprising a step of mixing a fluorine-containing phosphate ester represented by following formula (1), a fluorine-containing ether represented by following formula (2), a cyclic sulfone compound represented by following formula (8-1), and an open-chain or cyclic acid anhydride, wherein a content of the fluorine-containing phosphate ester is 5 vol % or more and 95 vol % or less in the nonaqueous electrolyte solvent and a part or all of hydrogen atoms of the acid anhydride is replaced with fluorine atom;

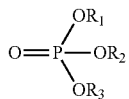
(1)

wherein $R_1$, $R_2$ and $R_3$ are fluorine-containing alkyl groups,

A-O—B  (2)

wherein A and B are each independently substituted or unsubstituted alkyl group, and at least one of A and B is a fluorine-containing alkyl group,

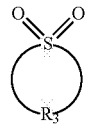
(8-1)

wherein, $R_3$ represents a substituted or unsubstituted alkylene group.

* * * * *